(12) United States Patent (10) Patent No.: US 8,997,132 B1
Rowe (45) Date of Patent: Mar. 31, 2015

(54) SYSTEM AND METHOD FOR IDENTIFYING COMPUTER SYSTEMS BEING USED BY VIEWERS OF TELEVISION PROGRAMS

(75) Inventor: Simon Michael Rowe, Finchampstead (GB)

(73) Assignee: Google Inc., Mountain View, CA (US)

( * ) Notice: Subject to any disclaimer, the term of this patent is extended or adjusted under 35 U.S.C. 154(b) by 112 days.

(21) Appl. No.: 13/346,586

(22) Filed: Jan. 9, 2012

Related U.S. Application Data

(60) Provisional application No. 61/564,181, filed on Nov. 28, 2011, provisional application No. 61/564,196, filed on Nov. 28, 2011.

(51) Int. Cl.
*H04H 60/32* (2008.01)
*H04H 60/33* (2008.01)
*H04N 21/23* (2011.01)

(52) U.S. Cl.
CPC ................................. *H04N 21/23* (2013.01)
USPC .................. 725/14; 725/10; 725/11; 725/12; 725/13; 725/18

(58) Field of Classification Search
CPC ............................................. H04N 21/44218
USPC ............................................... 725/10–14, 18
See application file for complete search history.

(56) References Cited

U.S. PATENT DOCUMENTS

| | | | | | |
|---|---|---|---|---|---|
| 4,718,106 | A | * | 1/1988 | Weinblatt | 455/2.01 |
| 5,450,490 | A | * | 9/1995 | Jensen et al. | 380/253 |
| 5,457,807 | A | * | 10/1995 | Weinblatt | 455/2.01 |
| 5,630,203 | A | * | 5/1997 | Weinblatt | 455/2.01 |
| 5,764,763 | A | * | 6/1998 | Jensen et al. | 380/253 |
| 6,693,544 | B1 | | 2/2004 | Hebbecker | |
| 7,155,159 | B1 | * | 12/2006 | Weinblatt et al. | 455/2.01 |
| 7,710,824 | B1 | * | 5/2010 | Katzer et al. | 367/99 |
| 2003/0171833 | A1 | * | 9/2003 | Crystal et al. | 700/94 |
| 2004/0031045 | A1 | * | 2/2004 | Ivanyi | 725/14 |
| 2004/0148159 | A1 | * | 7/2004 | Crockett et al. | 704/211 |
| 2007/0011040 | A1 | * | 1/2007 | Wright et al. | 705/10 |
| 2007/0061830 | A1 | * | 3/2007 | Chang | 725/9 |
| 2008/0120105 | A1 | * | 5/2008 | Srinivasan | 704/246 |
| 2010/0205628 | A1 | * | 8/2010 | Davis et al. | 725/25 |
| 2010/0222087 | A1 | | 9/2010 | Dragt | |
| 2012/0124604 | A1 | * | 5/2012 | Small et al. | 725/12 |

* cited by examiner

*Primary Examiner* — Gigi L Dubasky
(74) *Attorney, Agent, or Firm* — Morgan, Lewis & Bockius LLP

(57) ABSTRACT

A system, computer-readable storage medium storing at least one program, and a computer-implemented method for identifying computer systems being used by viewers of television programs is presented. An audio signal received from a microphone of a television metering device is monitored, where the audio signal corresponds to audio of a television program presented on the television set and audio tones generated by computer systems of viewers of the television set. The audio signal is analyzed to determine an identifier for the television program being presented on the television set and to identify an audio tone generated by a computer system of a viewer of the television set. An identifier of the computer system associated with the audio tone is determined. An identifier for the television metering device, the identifier for the television program, and the identifier of the computer system is transmitted to a server.

35 Claims, 13 Drawing Sheets

SYSTEM AND METHOD FOR IDENTIFYING COMPUTER SYSTEMS BEING USED BY VIEWERS OF TELEVISION PROGRAMS

RELATED APPLICATIONS

This application claims priority under 35 U.S.C. §119 to U.S. Provisional Patent Application No. 61/564,181, filed Nov. 28, 2011, entitled "System and Method for Identifying Viewers of Television Programs," and to U.S. Provisional Patent Application No. 61/564,196, filed Nov. 28, 2011, entitled "System and Method for Identifying Computer Systems Being Used by Viewers of Television Programs," which applications are incorporated by reference herein in their entirety.

TECHNICAL FIELD

The disclosed embodiments relate generally to identifying computer systems being used by viewers of television programs.

BACKGROUND

Media measurement devices allow entities conducting media research studies on viewing and/or listening habits of participants of the media research study to track the media items that the participants access (e.g., viewing, listening to) on a media device. For example, television (TV) metering devices are used to track television programs that viewers (typically participants who are paid for their participation) of a TV set are watching. Unfortunately, existing media measurement devices require participants to log into the media measurement devices to register which participants are in a room that includes a media device and are therefore exposed to the media items being presented by that media device. Typically, the participants log into and log out of media measurement devices by pressing a button on a remote controller associated with the media measurement device when the participants enter and leave a room that includes the media device, respectively. Unfortunately, participants often forget to log into or log out of the media measurement device when entering or leaving a room with a media device, respectively. Thus, the media measurement device may miss opportunities to track media items that the participants are accessing on a media device because the participants forgot to log into the media measurement device when entering the room including the media device, and may falsely determine that the participants are accessing media items on a media device when in fact the participants are not in the room including the media device because the participants forgot to log off of the media measurement device when leaving the room including the media device.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings.

DESCRIPTION OF EXAMPLE EMBODIMENTS

Figure 1:
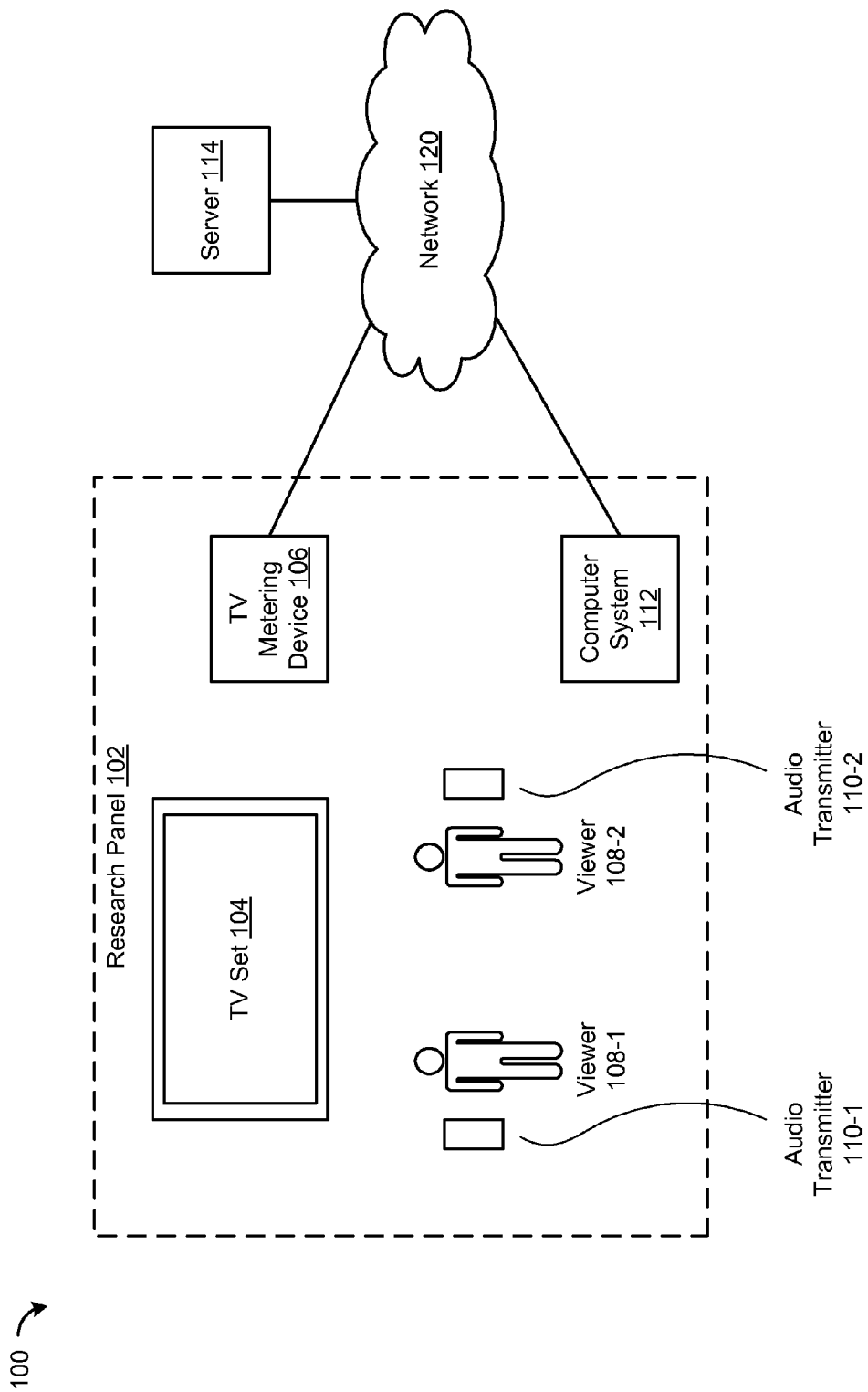
FIG. 1 is a block diagram illustrating a distributed system, according to some embodiments.

The description that follows includes example systems, methods, techniques, instruction sequences, and computing machine program products that embody illustrative embodiments. In the following description, for purposes of explanation, numerous specific details are set forth in order to provide an understanding of the disclosed embodiments. It will be evident, however, to those skilled in the art that various embodiments may be practiced without these specific details. In general, well-known instruction instances, protocols, structures and techniques have not been shown in detail.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

As discussed above, existing media measurement devices require participants of media research studies to actively log into and log out of a media measurement device when the participants enter and leave a room including a media device, respectively. This process is burdensome to the participants and may miss opportunities to track media items that the participants are accessing because the participants forgot to log into the media measurement device when entering the room including the media device and/or may falsely determine that the participants are accessing media items on a media device when in fact the participants are not in the room including the media device because the participants forgot to log off of the media measurement device when leaving the room including the media device. The embodiments described herein provide techniques for identifying participants of a media research study without the aforementioned deficiencies. Although the discussion below refers to TV metering devices and to viewers who are participants of a TV research study, the embodiments described herein may be applied to other media research studies on viewing and/or listening habits of participants of these research studies to track the media items that the participants access (e.g., viewing, listening to) on a media device. Note that the term "viewing" is used to refer to active viewing (e.g., the viewer views a television program being presented on a TV set and does not perform any other activities), divided viewing (e.g., the viewer views the television program being presented on the TV set while performing other activities), and/or presumed viewing (e.g., the viewer is in the same room as a TV set that is presenting the television program, but may or may not be actively viewing the television program).

FIG. 1 is a block diagram illustrating a distributed system 100, according to some embodiments. The distributed system 100 includes a TV metering device 106 and a TV set 104. In some embodiments, TV metering device 106 identifies at least one of a television program being presented on TV set 104, viewers 108 viewing the television program being presented on TV set 104, a computer system 112 of a viewer 108 of TV set 104, and a viewer 108 who is using computer system 112.

In some embodiments, TV metering device 106 is a device provided by an entity conducting research related to television programs and/or viewing habits of viewers of television programs. For example, the entity may be interested in tracking demographic information for viewers of television programs. In some embodiments, TV metering device 106 is provided by an entity conducting marketing research. For example, the entity conducting the marketing research may be interested in correlating demographic information for viewers of television programs with products and/or services that the viewers purchased. In some embodiments, device 106 is a user-provided device (e.g., a smart phone) with software provided by or on behalf of an entity conducting research related to television programs or an entity conducting marketing research.

In some embodiments, the viewers 108 are participants in a media research study. In these embodiments, the viewers 108 are members of a research panel 102. In some implementations, the viewers 108 of the research panel 102 are members of a household (e.g., persons living in the same house). In some implementations, the viewers 108 of the research panel 102 are members of a group (e.g., employees of a company, members of an association, members of an ad-hoc research group, etc.). In some embodiments, identifiers and demographic characteristics for the viewers 108 are stored in a research panel database, table or other information set 830, which includes a profile 832 for each distinct research panel 102. In some implementations, the profile 832 of a respective research panel 102 includes:

- a metering device identifier 834 for TV metering device 106,
- a television or monitor identifier 836 for TV set 104 (e.g., a model number of TV set 104, a serial number of TV set 104, a MAC address of TV set 104, etc.),
- a set of identifiers 838, including one for each audio transmitter 110 (e.g., a MAC address, etc.) and identifiers for the audio frequency at which each audio transmitter 110 is set to generate an audio signal,
- a mapping 840 from the audio transmitters 110 to the viewers 108, and/or vice versa,
- an identifier 842 of computer system 112, and
- an identifier 844 of the audio frequency at which computer system 112 is set to generate.

In some embodiments, the profile 832 of a respective research panel 102 includes a subset (e.g., one or more, or two or more) of the above-identified profile parameters. Optionally, the profile 832 of a respective research panel 102 includes one or more additional parameters.

In some embodiments, TV metering device 106 is a standalone device that is separate and distinct from TV set 104. In these embodiments, TV metering device 106 does not have direct knowledge of the television programs that are being watched by the viewers 108. Thus, in some embodiments, TV metering device 106 analyzes audio signals that are received by a microphone of TV metering device 106 and that include information relating to audio from a television program being presented on TV set 104. The result of the audio signal analysis is typically a program identifier, which identifies the television program presented on TV set 104. In some implementations, the program identifier is an identifier of a television program (e.g., one or more of a program identifier, a television channel identifier, and a timestamp) that corresponds to either a watermark embedded in the television program being presented on TV set 104 or a series of fingerprints of the audio signal. A number of audio signal fingerprinting methods are described in published documents and well known to those skilled in the art.

In order to reduce the burden on the viewers 108 (e.g., research panel participants) and to more accurately monitor the viewing and/or listening habits of participants of the research panel 102, each of the viewers 108 carries an audio transmitter 110 that generates a predetermined audio tone. In some embodiments, TV metering device 106 analyzes audio signals that are received from the microphone of TV metering device 106, which include information relating to audio generated by the audio transmitters 110 (e.g., the predetermined audio tone) of the viewers 108 who are viewing the television program being presented on TV set 104, to identify the viewers 108 who are viewing the television program being presented on TV set 104. In these embodiments, each respective viewer 108 (e.g., viewer 108-1, viewer 108-2) carries a respective audio transmitter 110 (e.g., audio transmitter 110-1, audio transmitter 110-2) that generates an audio tone that is associated with the respective viewer 108. In some embodiments, the respective audio transmitter 110 is a mobile device. In these embodiments, the audio tone is generated by a speaker of the mobile device. In some implementations, the audio tone generated by the respective audio transmitter 110 of the respective viewer 108 includes a single audio frequency of a predefined set of audio frequencies, all of which fall within a predetermined range of audio frequencies allocated to audio transmitters of viewers. Note that an audio tone that has "a single audio frequency" may include a plurality of frequency components. In some implementations, a frequency component in the plurality of frequency components that has an amplitude exceeding a predetermined threshold of the other frequency components in the plurality of frequency components by at least a predetermined threshold (e.g., one frequency component exceeds the other frequency components in amplitude by at least 20 dB) is referred to as the "single audio frequency." In some implementations, the single audio frequency of an audio tone is the frequency at or near the center of a range of audio frequencies having at least a predefined portion (e.g., at least 75%) of the audio signal energy in the audio tone.

In some implementations, the audio tone generated by the respective audio transmitter 110 of the respective viewer is a sub-audible tone. Note that a sub-audible tone is a tone that is in an audio frequency range not noticeable to an average human listener, and/or that has an amplitude that makes the audio tone not noticeable to an average human listener. In some implementations, the audio tone generated by the respective audio transmitter has a known and predetermined amplitude at the single audio frequency. In some implementations, the known and predetermined amplitude of the audio tone is used to determine the distance of the respective audio transmitter from the TV metering device (or a microphone of the TV metering device). In some implementations, the audio tone is periodically generated (e.g., for 5 seconds, once per minute) by the respective audio transmitter 110 of the respective view 108. Generating the audio tone periodically, with a predefined duty cycle (e.g., a duty cycle of 20% or less, or 10% or less) reduces energy usage and lengthens battery life of the audio transmitter 110.

The viewers 108 of TV set 104 may use computer system 112 while viewing television programs on TV set 104. Information relating to whether at least one of the viewers 108 used computer system 112 while viewing a television program on TV set 104 and which viewer used computer system 112 may be useful to the entity conducting research related to television programs and/or viewing habits of viewers of television programs. For example, if the viewer 108-2 uses computer system 112 during the presentation of a particular television program, the entity may determine that the viewer 108-2 is not actively watching the particular television program and, therefore, the viewer 108-2 may not be interested in the particular television program. In order to determine whether computer system 112 is being used while the viewers 108 are viewing television programs on TV set 104, computer system 112 generates a predetermined audio tone. In some embodiments, TV metering device 106 analyzes audio signals that are received from the microphone of TV metering device 106 and that include information relating to audio generated by computer system 112 (e.g., the predetermined audio tone) that is being used by a viewer 108 of TV set 104 to identify computer system 112 that is being used by a viewer 108 of TV set 104. In these embodiments, computer system 112 generates an audio tone that is associated with computer system 112 using a speaker of computer system 112. In some implementations, the audio tone generated by computer system 112 of the viewer 108 includes a single audio frequency within a predetermined range of audio frequencies allocated to computer systems. In some implementations, the audio tone generated by computer system 112 of the viewer 108 is a sub-audible tone. In some implementations, the audio tone is periodically generated (e.g., for 5 seconds every minute) by computer system 112. Generating the audio tone periodically, with a predefined duty cycle (e.g., a duty cycle of 20% or less, 10% or less, or 8.5% or less) reduces energy usage and lengthens battery life of the audio transmitter 110.

In some embodiments, computer system 112 identifies the viewer who is using computer system 112 and encodes an identifier for the viewer 108 in the audio tone generated by computer system 112. For example, computer system 112 may use an amplitude modulation technique to encode the identifier for the viewer 108 in the audio tone that is associated with computer system 112. Alternatively, computer system 112 may use a frequency modulation technique to encode the identifier for the viewer 108 in the audio tone that is associated with computer system 112. In these embodiments, TV metering device 106 analyzes audio signals that are received from the microphone of TV metering device 106 and that include information relating to audio generated by computer system 112 (e.g., the audio tone) that is being used by a viewer 108 of TV set 104 to identify the viewer 108 that is using computer system 112. In these embodiments, computer system 112 encodes an identifier for the viewer 108 in an audio tone that is associated with computer system 112 using a speaker of computer system 112. In some implementations, the audio tone generated by computer system 112 of the viewer 108 includes a single audio frequency within a predetermined range of audio frequencies allocated to computer systems. In some implementations, the audio tone generated by computer system 112 of the viewer 108 is a sub-audible tone.

After TV metering device 106 identifies the viewers 108 of TV set 104, the television program being presented on TV set 104, and/or computer system 112, TV metering device 106 returns this information to a server system 114 via network 120. Server system 114 is sometimes herein called a server for ease of reference, even though server system 114 may include multiple servers in some embodiments. Network 120 can generally include any type of wired or wireless communication channel capable of coupling together computing nodes. This includes, but is not limited to, a local area network, a wide area network, or a combination of networks. In some embodiments, network 120 includes the Internet.

In some embodiments, TV metering device 106 transmits to server system 114 via network 120 an identifier of the television program being presented on TV set 104 (or alternatively, a sequence of fingerprints of the television program's audio signal) and identifiers for the viewers 108 viewing the television program being presented on TV set 104. Server system 114 obtains and aggregates demographic characteristics of the viewers 108 (e.g., age, sex, occupation, location, etc.) viewing the television program being presented on TV set 104 with demographic characteristics of other viewers of other TV sets that are also watching (or have watched) the television program. Optionally, server system 114 analyzes the aggregated demographics of the viewers of the television program to produce a demographic profile of the television program. The demographic profile of the television program indicates a likelihood that a viewer (or a percentage of the population of viewers) having particular demographic characteristics is viewing the television program. For example, the demographic profile of the television program may indicate that there is a 30% chance that a viewer of the television program is a female between 18 and 25 years old. Similarly, the demographic profile of the television program may indicate that 30% of viewers of the television program are females between 18 and 25 years old.

In some embodiments, the demographic profile of the television program is used to select advertisements to be presented to viewers of the television program during the presentation of the television program. The advertisements that are selected include advertisements whose target audience has demographic characteristics that are included in the demographic profile of the television program.

In some embodiments, server system 114 uses the demographic profile of the television program to generate a demographic profile of a second television program. For example, if the television program and the second television program are in the same genre (e.g., comedy, drama, etc.), server system 114 may use at least a portion of the demographic profile of the television program to generate the demographic profile of the second television program. Similarly, if the television program and the second television program are episodes in a television series, server system 114 may use at least a portion of the demographic profile of the television program to generate the demographic profile of the second television program In some embodiments, TV metering device 106 also transmits an identifier of computer system 112 of the viewer 108 of TV set 104. In these embodiments, server system 114 augments the demographic profile of the television program to indicate that a computer system (e.g., computer system 112) was used by a viewer of the television program during the presentation of the television program.

In some embodiments, computer system 112 identifies a viewer 108 that is using computer system 112. In some implementations, computer system 112 analyzes audio signals that are received by a microphone of computer system 112 and that include information relating to audio generated by the audio transmitters 110 of the viewers 108 to identify a viewer 108 that is using computer system 112. As discussed above, each respective viewer 108 (e.g., the viewer 108-1, the viewer 108-2) carries a respective audio transmitter 110 (e.g., audio transmitter 110-1, or audio transmitter 110-2) that generates an audio tone that is associated with the respective viewer 108. In some implementations, computer system 112 uses login credentials (e.g., username) that the viewer 108 used to log into computer system 112 to identify the viewer 108.

In some embodiments, computer system 112 encodes the identifier of the viewer 108 that is using computer system 112 in an audio tone generated by the speaker of computer system 112. The microphone for TV metering device 106 receives audio signals corresponding to the audio tone generated by the speaker of computer system 112 and analyzes the signal to identify computer system 112 and the viewer 108 that is using computer system 112. TV metering device 106 then generates an association between the viewer 108 and computer system 112 and transmits the identifier of computer system 112, the identifier of the viewer 108, and the association between the viewer 108 and computer system 112 to server system 114.

In some embodiments, computer system 112 transmits the association between the identifier of computer system 112 and the identifier of the viewer 108 that is using computer system 112 during the presentation of the television program to server system 114 and TV metering device 106 transmits the identifier of computer system 112 to server system 114.

In the embodiments where server system 114 receives the association between the identifier of computer system 112 and the identifier of viewer 108, server system 114 augments the demographic profile of the television program to indicate that viewers having the demographic characteristics of viewer 108 are likely to use a computer system when being presented the television program. For example, the demographic profile of the television program may indicate that males between the ages of 25 and 30 are likely to use a computer system while viewing the television program.

In some embodiments, TV metering device 106 also transmits an identifier for TV metering device 106. The identifier for TV metering device 106 is used to identify a research panel 102 to which TV metering device 106 belongs and/or TV set 104 being monitored. As discussed above, TV metering device 106 is associated with the research panel 102. Thus, in some implementations, the identifier for TV metering device 106 is used to identify the research panel 102 to which the identifiers of the viewers 108, the identifier of television program, and/or the identifier of computer system 112 belong.

In some embodiments, TV set 104 is coupled to network 120 and transmits a viewing log to server system 114 via network 120. The viewing log includes information relating to channels that the viewers of TV set 104 selected (or tuned to) and corresponding dates and/or times that the viewers 108 of the TV set 108 selected the channels. In some implementations, instead of identifying the television program being presented on TV set 104, TV metering device 106 identifies the viewers 108 viewing the television program being presented on the TV set and identifies the dates and/or times that the viewers 108 viewed the television program. TV metering device 106 then transmits to server system 114 identifiers of the viewers 108 and the dates and/or times that the viewers 108 viewed the television program. In some implementations, server system 114 obtains or accesses a television program guide to identify the television programs presented to viewers 108 in research panel 102. Server system 114 then correlates the television programs with the dates and/or times that the viewers 108 were viewing television programs on TV set 104, and aggregates that information with similar information for other research panels, to generate a demographic profile of the television program.

In some embodiments, the functionality of TV metering device 106 is included in an application executing on a computer system (e.g., computer system 112).

Note that although FIG. 1 shows two viewers 108 and one instance for each of TV set 104, TV metering device 106, and computer system 112, multiple viewers, TV sets, TV metering devices, and computer systems may be present in the research panel 102. Similarly, although FIG. 1 shows one instance of the research panel 102, multiple research panels may be present in the distributed system 100.

Also note that although FIG. 1 shows one instance of server system 114, multiple servers may be present in the distributed system 100. For example, server system 114 may include a plurality of distributed servers. In some implementations, the plurality of distributed servers provide load balancing and/or low-latency points of access to nearby computer systems. Optionally, the distributed servers are located within a single location (e.g., a data center, a building, etc.) or are geographically distributed across multiple locations (e.g., data centers at various geographical locations, etc.).

Figure 2:
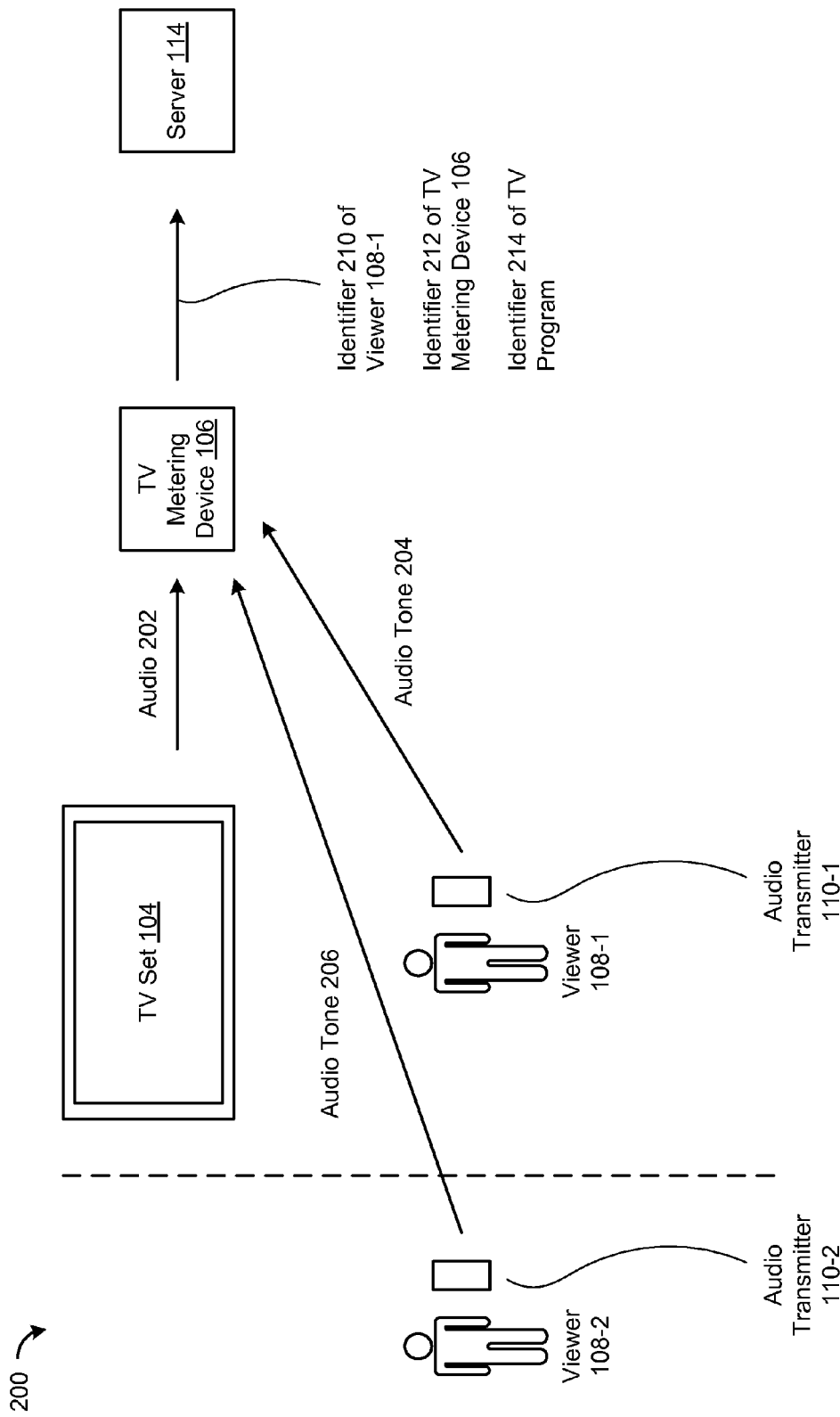
FIG. 2 is a block diagram illustrating an example process of identifying viewers of television programs, according to some embodiments.

FIG. 2 is a block diagram 200 illustrating a process of identifying viewers of television programs, according to some embodiments. TV metering device 106 is either placed in a room including TV set 104 (e.g., the same room as TV set 104) or a placed in a room separate and distinct from the room including TV set 104. When TV metering device 106 is in the room including TV set 104, TV metering device 106 is placed within a predetermined distance of TV set 104 so that a microphone of TV metering device 106 is able to receive audio from a TV program playing on TV set 104. For example, TV metering device 106 may be placed adjacent to TV set 104. When TV metering device 106 is placed in a room separate and distinct from the room including TV set 104, a microphone for TV metering device 106 is placed within a predetermined distance of TV set 104 so that the microphone of TV metering device 106 is able to receive audio from a TV program playing on TV set 104. In some implementations, the microphone for TV metering device 106 is coupled to TV metering device 106 wirelessly (e.g., via a wireless network, radio-frequency signals, infrared signals, etc.). In some implementations, the microphone for TV metering device 106 is coupled to TV metering device 106 via a wire.

The viewer 108-1 is within a maximum distance from TV metering device 106 (as indicated by the dashed line) at which a viewer is deemed to still be in a room including TV set 104. An assumption is made that a viewer within the maximum distance from TV metering device 106 at which a viewer is deemed to still be in a room including TV set 104 is likely to be viewing the TV program being presented on the TV set. As illustrated in FIG. 2, TV set 104 generates audio 202 corresponding to a television program and audio transmitter 110-1 for viewer 108-1 generates an audio tone 204. The microphone for TV metering device 106 generates audio signals corresponding to the audio 202 and the audio tone 204. TV metering device 106 analyzes the audio signals received from the microphone of TV metering device 106 to identify the television program being presented by TV set 104 and an identifier for the viewer 108-1. TV metering device 106 transmits an identifier 210 of the viewer 108-1, an identifier 212 of TV metering device 106, and an identifier 214 of the TV program to server system 114.

The viewer 108-2 is beyond a maximum distance from TV metering device 106 (as indicated by the dashed line) at which a viewer is deemed to still be in a room including TV set 104. An assumption is made that a viewer who is beyond the maximum distance from TV metering device 106 at which a viewer is deemed to still be in a room including TV set 104 is likely not to be viewing the TV program being presented on TV set 104. Although the microphone for TV metering device 106 may detect an audio tone 206 of audio transmitter 110-2 for viewer 108-2, the amplitude of audio tone 206 is below a predetermined amplitude that corresponds to a maximum distance between the audio transmitter and TV metering device 106 at which a viewer is deemed to still be in a same room as a TV set 104. Thus, when TV metering device 106 analyzes the audio signals received from the microphone of TV metering device 106, TV metering device 106 determines that an amplitude of audio tone 206 of audio transmitter 110-2 is below the predetermined amplitude that corresponds to the maximum distance between the audio transmitter and TV metering device 106 at which a viewer is deemed to still be in a same room as TV set 104 and, therefore, determines that viewer 108-2 is not in the same room as TV set 104. Accordingly, TV metering device 106 does not identify an identifier for viewer 108-2.

Figure 3:
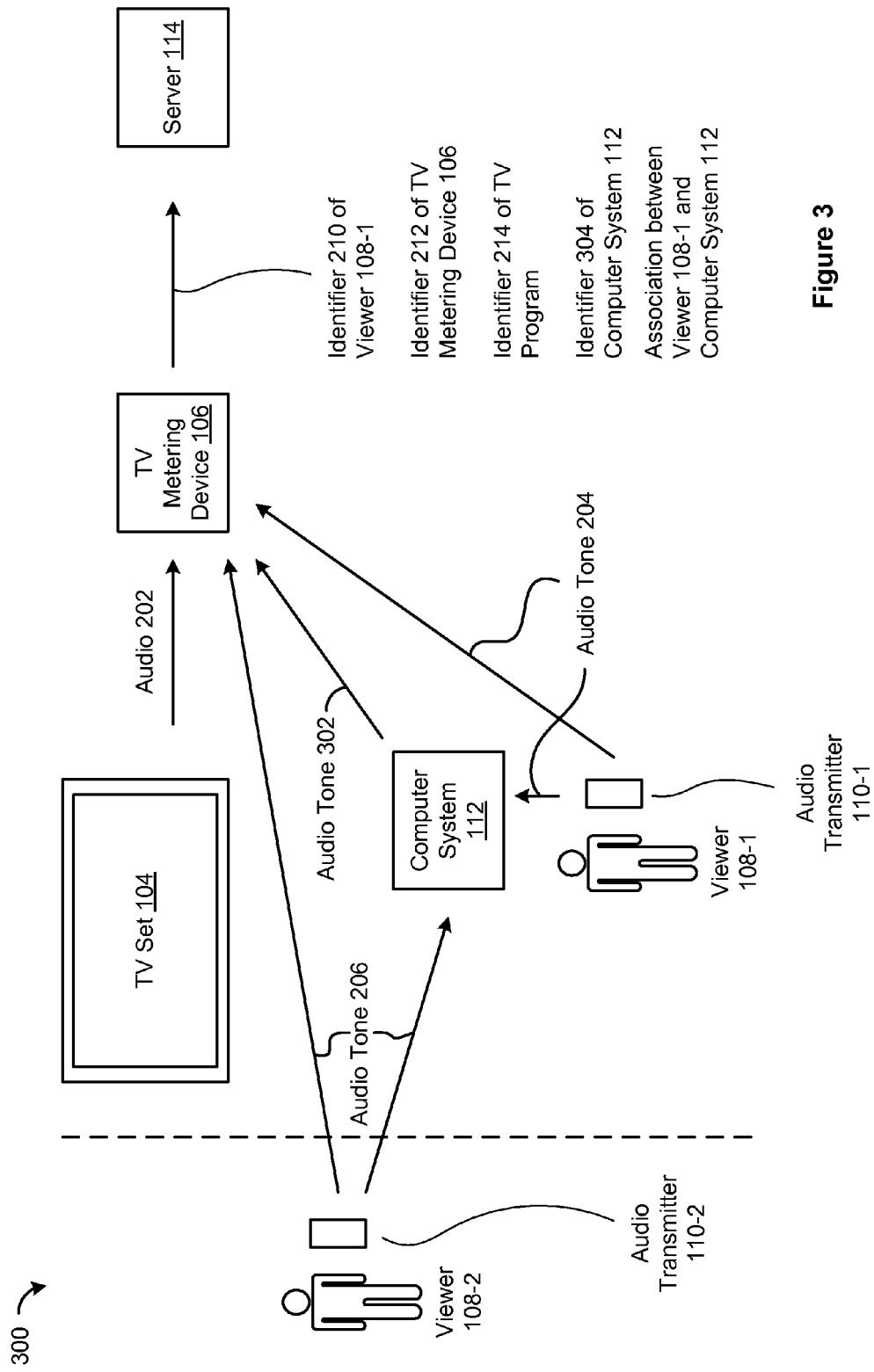
FIG. 3 is a block diagram illustrating another example process of identifying viewers of television programs, according to some embodiments.

FIG. 3 is a block diagram 300 illustrating a process of identifying viewers of television programs, according to some embodiments. The process illustrated in FIG. 3 is similar to the process illustrated in FIG. 2, except that FIG. 3 includes computer system 112. Thus, only the differences are discussed. In FIG. 3, viewer 108-1 is using computer system 112 while viewing the television program being presented on TV set 104. Computer system 112 generates an audio tone 302 to indicate that computer system 112 is being used. In some implementations, computer system 112 only generates audio tone 302 when computer system 112 is actively being used by a viewer or has received input via a user input device of computer system 112 (e.g., a keyboard, a pointing device, etc.) from the viewer within a predetermined time period (e.g., within the last 5 minutes). For example, computer system 112 does not generate audio tone 302 when computer system 112 has been idle for ten minutes.

When computer system 112 is being used by viewer 108-1, computer system 112 generates audio tone 302. The microphone for TV metering device 106 detects audio tone 202, audio tone 204, and audio tone 302 and generates audio signals corresponding to audio 202, audio tone 204, and audio tone 302. TV metering device 106 analyzes the audio signals received from the microphone of TV metering device 106 to identify the identifier 210 of viewer 108-1, the identifier 212 of the television program being presented by TV set 104, and the identifier 304 of computer system 112. TV metering device 106 then transmits the identifier 210 of viewer 108-1, the identifier 212 of TV metering device 106, the identifier 214 of the TV program, and an identifier 304 of computer system 112 to server system 114.

In some implementations, a microphone for computer system 112 receives the audio tones 204 and 206 and generates audio signals that computer system 112 uses to identify the viewer using computer system 112. Computer system 112 identifies the viewer using computer system 112 by analyzing the audio signals to identify the single audio tone that has the largest amplitude, corresponding to the audio transmitter that is closest to computer system 112. Computer system 112 then identifies the viewer using the frequency of the single audio tone. In this example, computer system 112 identifies viewer 108-1 as the viewer using computer system 112. In some implementations, computer system 112 encodes the identifier of viewer 108-1 in audio tone 302 (e.g., using amplitude modulation, using frequency modulation, etc.). When computer system 112 encodes the identifier 210 of viewer 108-1 in audio tone 302, TV metering device 306 also extracts the identifier of viewer 108-1 from the audio signals corresponding to audio tone 302. TV metering device 106 may then generate an association between viewer 108-1 and computer system 112. Optionally, in addition to the identifier 210 of viewer 108-1, the identifier 212 of TV metering device 106, the identifier 214 of the TV program, and an identifier 304 of computer system 112, TV metering device 106 also transmits the association between viewer 108-1 and computer system 112 to server system 114.

Figure 4:
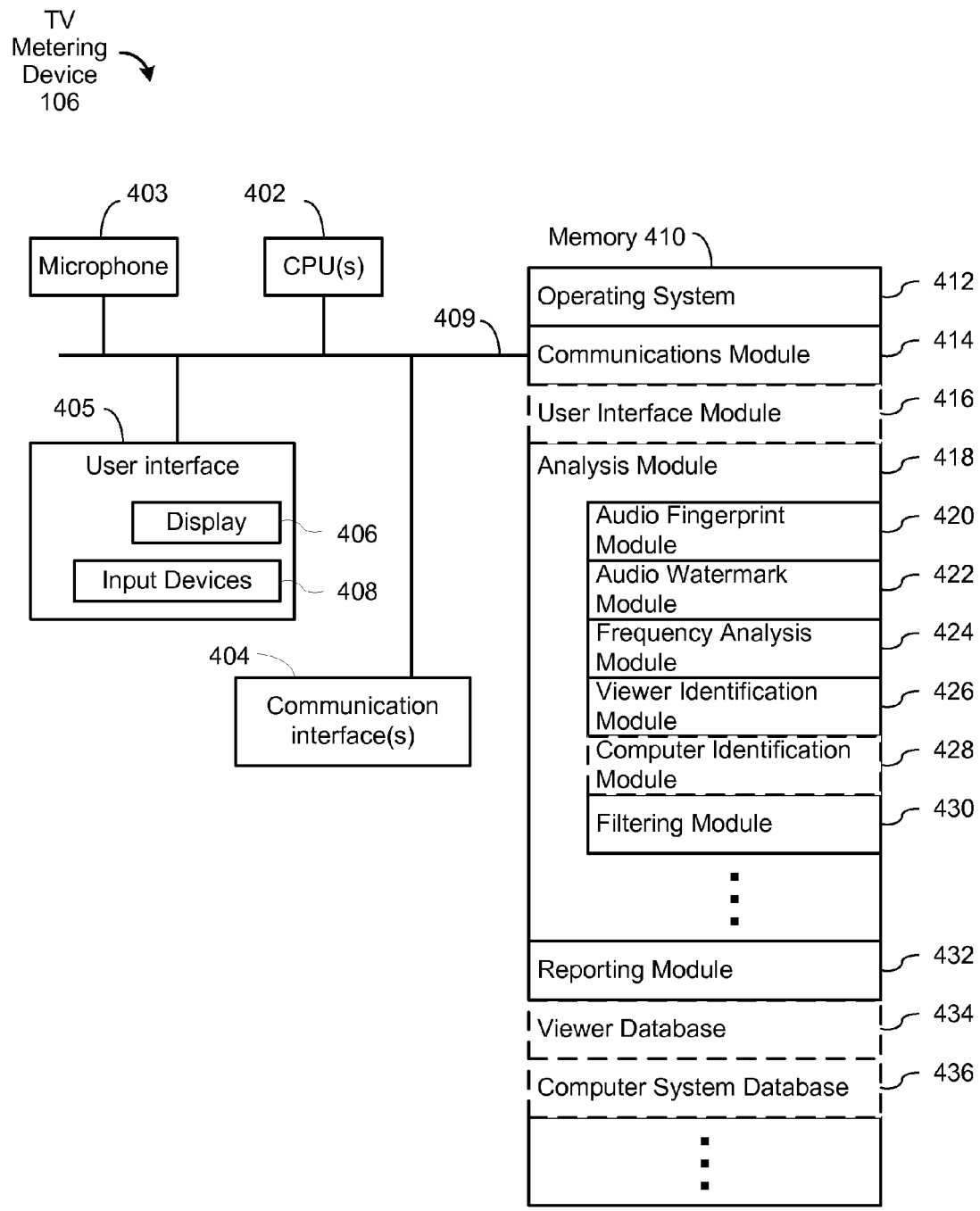
FIG. 4 is a block diagram illustrating an example TV metering device, according to some embodiments.

FIG. 4 is a block diagram illustrating TV metering device 106, according to some embodiments. TV metering device 106 typically includes one or more processing units (CPU's, sometimes called processors) 402 for executing programs (e.g., programs stored in memory 410), a microphone 403 for receiving audio and generating corresponding audio signals that are analyzed by TV metering device 106, one or more network or other communications interfaces 404, memory 410, and one or more communication buses 409 for interconnecting these components. The communication buses 409 may include circuitry (sometimes called a chipset) that interconnects and controls communications between system components. TV metering device 106 optionally includes a user interface 405 comprising a display device 406 and input devices 408 (e.g., keyboard, mouse, touch screen, keypads, a remote controller, etc.). Memory 410 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 410 optionally includes one or more storage devices remotely located from the CPU(s) 402. Memory 410, or alternately the non-volatile memory device(s) within memory 410, comprises a non-transitory computer readable storage medium. In some embodiments, memory 410 or the computer readable storage medium of memory 410 stores the following programs, modules and data structures, or a subset thereof:

- an operating system 412 that includes procedures for handling various basic system services and for performing hardware dependent tasks;
- a communication module 414 that is used for connecting TV metering device 106 to other computers via the one or more communication interfaces 404 (wired or wireless) and one or more communication networks, such as the Internet, other wide area networks, local area networks, metropolitan area networks, and so on;
- an optional user interface module 416 that receives commands from the user via the input devices 408 and controls what is displayed on display device 406 (e.g., generates user interface objects for display on the display device 406, or determines which of a predefined set of user interface objects are displayed on display device 406);
- an analysis module 418 that includes at least one or more (and in some embodiments two or more) of the following: an audio fingerprint module 420, an audio watermark module 422, a frequency analysis module 424, an optional viewer identification module 426, an optional computer identification module 428, and a filtering module 430, as described herein;
- a reporting module 432 that transmits an identifier of the a television program being presented on a TV set (e.g., TV set 104), identifiers for viewers 108 (e.g., audio tone identifiers of detected audio tones, or user identifiers) viewing the television program being presented on the TV set, an identifier of TV metering device 106, an identifier of the computer systems being used by viewers of the television program (e.g., computer system 112), and/or associations between viewers using computer systems (e.g., computer system 112) and the computer systems, as described herein;
- an optional viewer database 434 including identifiers for viewers (e.g., the viewers 108) associated with TV metering device 106, associations between each viewers and an audio frequency generated by an audio transmitter 110 (e.g., the audio transmitter 110-1, the audio transmitter 110-2, etc.) for the viewer; and
- an optional computer system database 436 including identifiers for computer systems (e.g., computer system 112) associated with TV metering device 106.

In some embodiments, the programs or modules identified above correspond to sets of instructions for performing a function described above. The sets of instructions can be executed by one or more processors (e.g., CPUs 402). The above identified modules or programs (i.e., sets of instructions) need not be implemented as separate software programs, procedures or modules, and thus various subsets of these programs or modules may be combined or otherwise re-arranged in various embodiments. In some embodiments, memory 410 stores a subset of the modules and data structures identified above. Furthermore, memory 410 may store additional modules and data structures not described above.

Although FIG. 4 shows a "TV metering device," FIG. 4 is intended more as functional description of the various features which may be present in a TV metering device than as a structural schematic of the embodiments described herein. In practice, and as recognized by those of ordinary skill in the art, items shown separately could be combined and some items could be separated.

Figure 5:
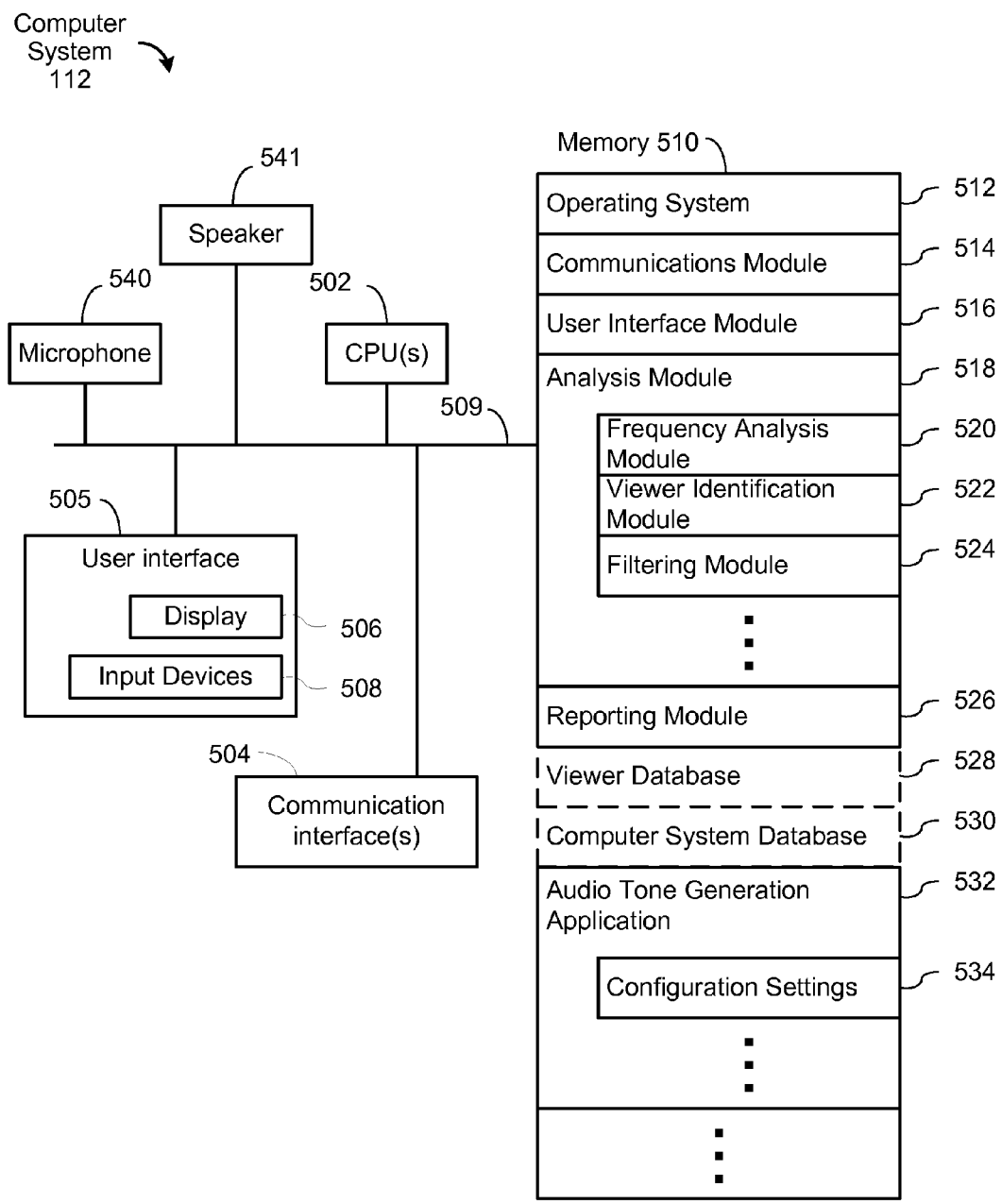
FIG. 5 is a block diagram illustrating an example computer system, according to some embodiments.

FIG. 5 is a block diagram illustrating computer system 112, according to some embodiments. Computer system 112 typically includes one or more processing units (CPU's, sometimes called processors) 502 for executing programs (e.g., programs stored in memory 510), a microphone 540 for receiving audio and generating corresponding audio signals that are analyzed by computer system 112, a speaker 541 for generating audio tones, one or more network or other communications interfaces 504, memory 510, and one or more communication buses 509 for interconnecting these components. The communication buses 509 may include circuitry (sometimes called a chipset) that interconnects and controls communications between system components. Computer system 112 includes a user interface 505 comprising a display device 506 and input devices 508 (e.g., keyboard, mouse, touch screen, keypads, etc.). Memory 510 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 510 optionally includes one or more storage devices remotely located from the CPU(s) 502. Memory 510, or alternately the non-volatile memory device(s) within memory 510, comprises a non-transitory computer readable storage medium. In some embodiments, memory 510 or the computer readable storage medium of memory 510 stores the following programs, modules and data structures, or a subset thereof:

- an operating system 512 that includes procedures for handling various basic system services and for performing hardware dependent tasks;
- a communication module 514 that is used for connecting computer system 112 to other computers via the one or more communication interfaces 504 (wired or wireless) and one or more communication networks, such as the Internet, other wide area networks, local area networks, metropolitan area networks, and so on;
- a user interface module 516 that receives commands from the user via the input devices 508 and generates user interface objects and/or text, images and the like for display on display device 506;
- an analysis module 518 that includes a frequency analysis module 520, a viewer identification module 522, and a filtering module 524, as described herein;
- a reporting module 526 that transmits identifiers for viewers (e.g., the viewers 108) using computer system 112, the identifier of computer system 112, and/or associations between viewers using computer system 112 and computer system 112, as described herein;
- an optional viewer database 528 including identifiers for viewers (e.g., the viewers 108) associated with computer system 112, associations between each viewers and an audio frequency generated by an audio transmitter 110 (e.g., audio transmitter 110-1, audio transmitter 110-2, etc.) for the viewer;

a computer system database 530 including identifiers for computer systems (e.g., computer system 112) associated with TV metering device 106; and an optional audio tone generation application 532 that generates an audio tone having a particular frequency within a predetermined range of frequencies allocated to computer systems of viewers identifying computer system 112 and/or that encodes an identifier of a viewer who is using computer system 112 based on configuration settings 534, where the configuration settings 534 include information associating the viewer with the particular audio frequency.

In some embodiments, the programs or modules identified above correspond to sets of instructions for performing a function described above. The sets of instructions can be executed by one or more processors (e.g., CPUs 502). The above identified modules or programs (i.e., sets of instructions) need not be implemented as separate software programs, procedures or modules, and thus various subsets of these programs or modules may be combined or otherwise re-arranged in various embodiments. In some embodiments, memory 510 stores a subset of the modules and data structures identified above. Furthermore, memory 510 may store additional modules and data structures not described above.

Although FIG. 5 shows a "computer system," FIG. 5 is intended more as functional description of the various features which may be present in a computer system than as a structural schematic of the embodiments described herein. In practice, and as recognized by those of ordinary skill in the art, items shown separately could be combined and some items could be separated.

Figure 6:
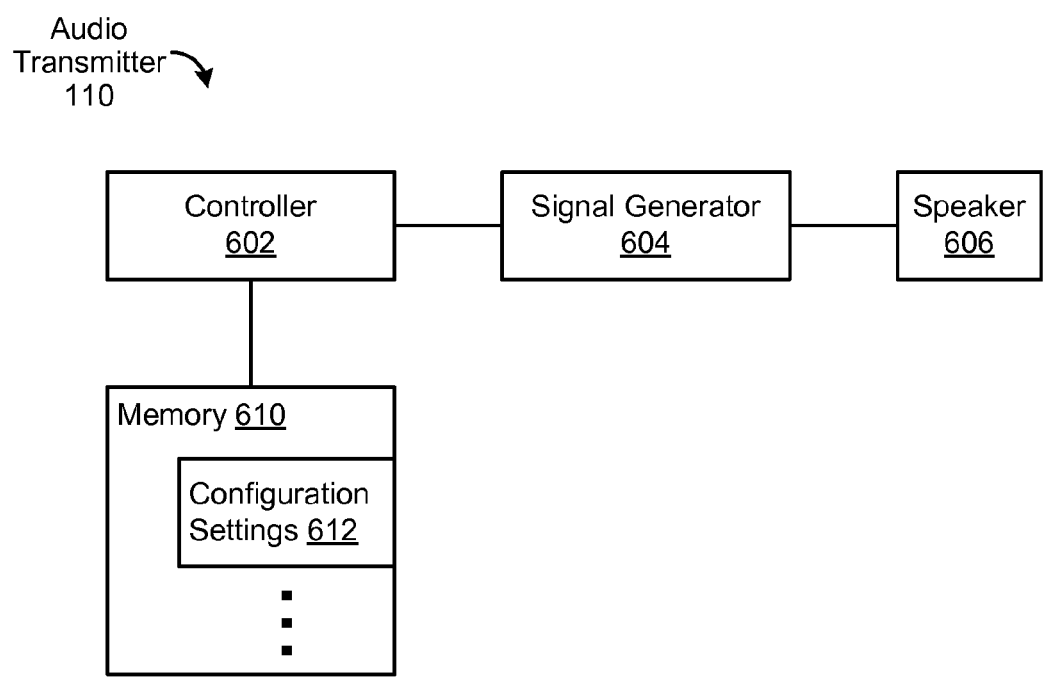
FIG. 6 is a block diagram illustrating an example audio transmitter, according to some embodiments.

FIG. 6 is a block diagram illustrating the audio transmitter 110, according to some embodiments. The audio transmitter 110 includes a controller, a signal generator 604, a speaker 606, and memory 610. Memory 610 includes non-volatile memory, such as flash memory devices or other non-volatile solid state storage devices. Memory 610, or alternately the non-volatile memory device(s) within memory 610, comprises a non-transitory computer readable storage medium. In some embodiments, memory 610 or the computer readable storage medium of memory 610 stores configuration settings 612 that are used by the controller 602 to instruct the signal generator 604 to generate, using speaker 606, an audio tone having a particular frequency within a predetermined range of frequencies allocated to audio transmitters of viewers.

Figure 7:
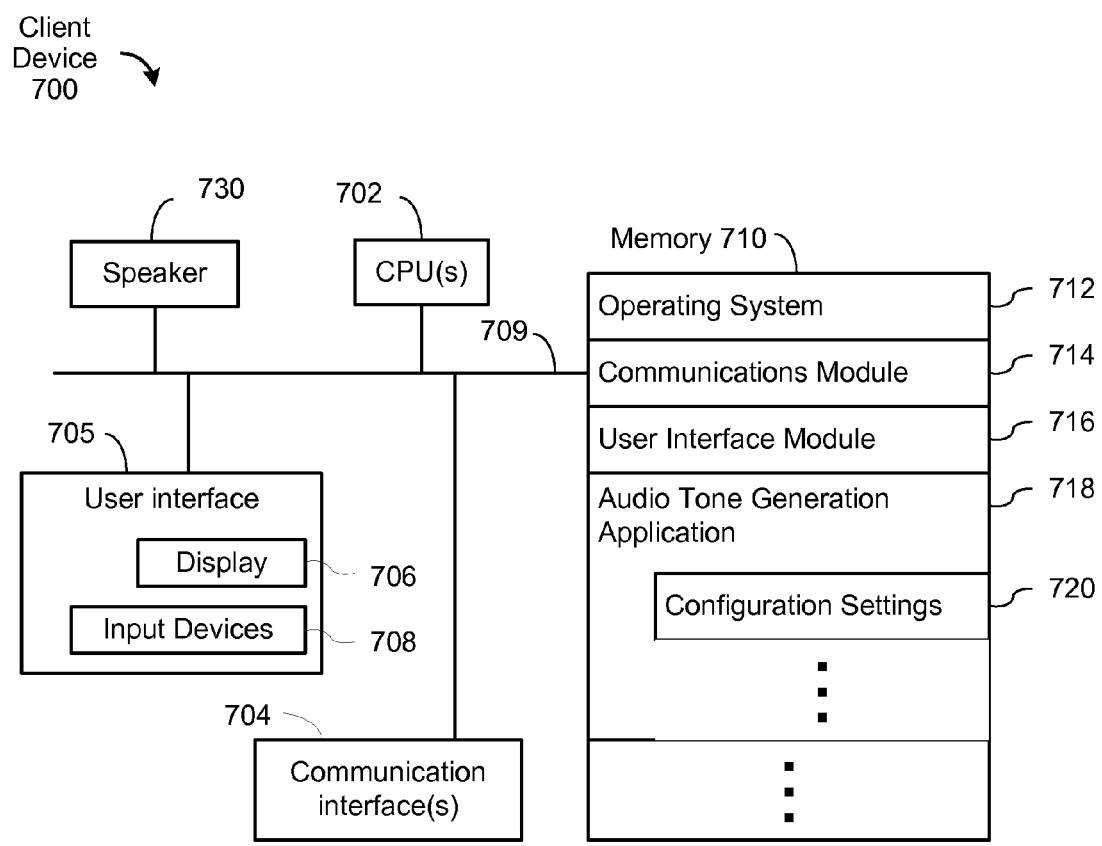
FIG. 7 is a block diagram illustrating a client device for generating audio tones, according to some embodiments.

FIG. 7 is a block diagram illustrating a client device 700 for generating audio tones, according to some embodiments. A viewer may carry the client device 700 that is executing an application that generates an audio tone having an audio frequency corresponding to the viewer instead of carrying a separate audio transmitter. The client device 700 typically includes one or more processing units (CPU's, sometimes called processors) 702 for executing programs (e.g., programs stored in memory 710), a speaker 730 for generating audio tones, one or more network or other communications interfaces 704, memory 710, and one or more communication buses 709 for interconnecting these components. The communication buses 709 may include circuitry (sometimes called a chipset) that interconnects and controls communications between system components. The client device 700 includes a user interface 705 comprising a display device 706 and input devices 708 (e.g., keyboard, mouse, touch screen, keypads, etc.). Memory 710 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 710 optionally includes one or more storage devices remotely located from the CPU(s) 702. Memory 710, or alternately the non-volatile memory device(s) within memory 710, comprises a non-transitory computer readable storage medium. In some embodiments, memory 710 or the computer readable storage medium of memory 710 stores the following programs, modules and data structures, or a subset thereof:

an operating system 712 that includes procedures for handling various basic system services and for performing hardware dependent tasks;

a communication module 714 that is used for connecting the client device 700 to other computers via the one or more communication interfaces 704 (wired or wireless) and one or more communication networks, such as the Internet, other wide area networks, local area networks, metropolitan area networks, and so on;

a user interface module 716 that receives commands from the user via the input devices 708 and generates user interface objects in the display device 706; and an audio tone generation module 718 for generating an audio tone having a particular audio frequency based on configuration settings 720, where the configuration settings 720 include information associating the viewer with the particular audio frequency.

In some embodiments, the programs or modules identified above correspond to sets of instructions for performing a function described above. The sets of instructions can be executed by one or more processors (e.g., CPUs 702). The above identified modules or programs (i.e., sets of instructions) need not be implemented as separate software programs, procedures or modules, and thus various subsets of these programs or modules may be combined or otherwise re-arranged in various embodiments. In some embodiments, memory 710 stores a subset of the modules and data structures identified above. Furthermore, memory 710 may store additional modules and data structures not described above.

Although FIG. 7 shows a "client device," FIG. 7 is intended more as functional description of the various features which may be present in a client device than as a structural schematic of the embodiments described herein. In practice, and as recognized by those of ordinary skill in the art, items shown separately could be combined and some items could be separated.

Figure 8:
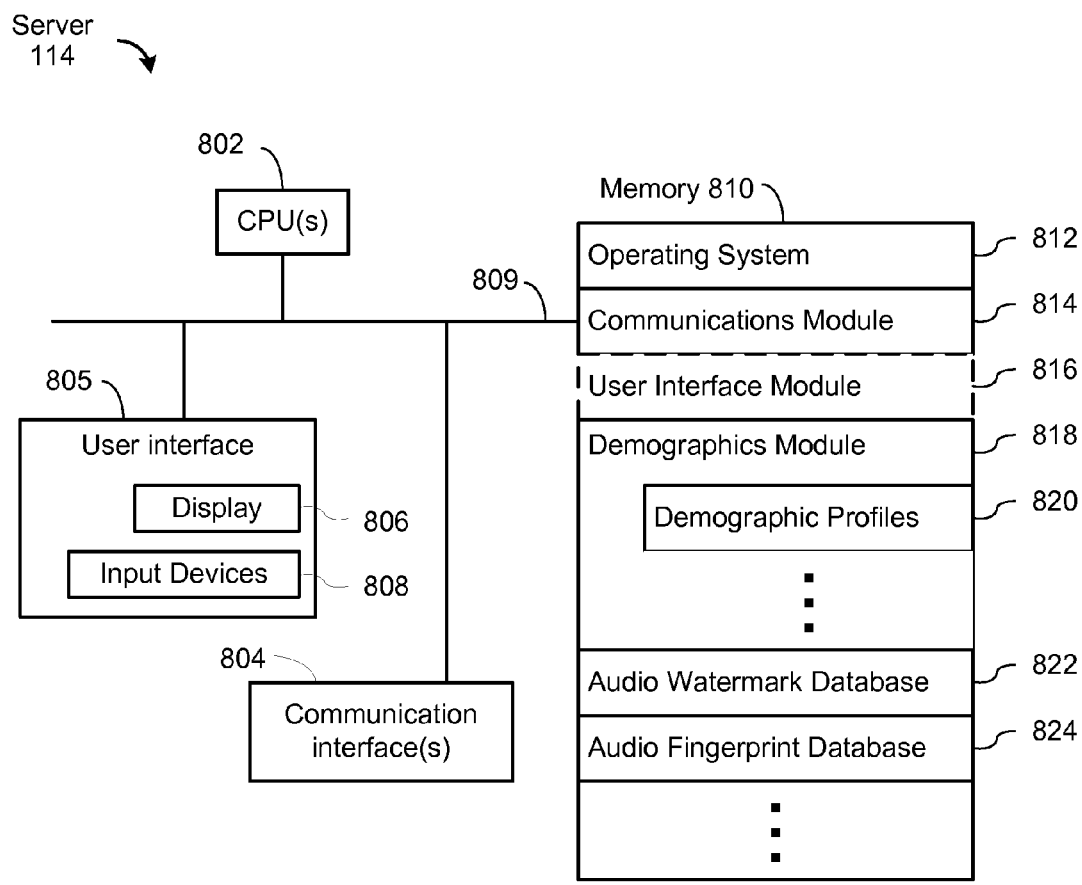
FIG. 8 is a block diagram illustrating an example server system, according to some embodiments.

FIG. 8 is a block diagram illustrating server system 114, according to some embodiments. Server system 114 typically includes one or more processing units (CPU's, sometimes called processors) 802 for executing programs (e.g., programs stored in memory 810), one or more network or other communications interfaces 804, memory 810, and one or more communication buses 809 for interconnecting these components. The communication buses 809 may include circuitry (sometimes called a chipset) that interconnects and controls communications between system components. Server system 114 optionally includes (but typically does not include) a user interface 805 comprising a display device 806 and input devices 808 (e.g., keyboard, mouse, touch screen, keypads, etc.). Memory 810 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 810 optionally includes one or more storage devices remotely located from the CPU(s) 802. Memory 810, or alternately the non-volatile memory device(s) within memory 810, comprises a non-transitory computer readable storage medium. In some embodiments, memory 810 or the computer readable storage medium of memory 810 stores the following programs, modules and data structures, or a subset thereof:

- an operating system 812 that includes procedures for handling various basic system services and for performing hardware dependent tasks;
- a communication module 814 that is used for connecting server system 114 to other computers via the one or more communication interfaces 804 (wired or wireless) and one or more communication networks, such as the Internet, other wide area networks, local area networks, metropolitan area networks, and so on;
- an optional user interface module 816 that receives commands from the user via the input devices 808 and generates user interface objects for display on display device 806;
- a demographics module 818 that obtains demographic characteristics for viewers using identifiers of the viewers and generates demographic profiles 820 of television programs using the demographic characteristics of the viewers of the television programs, as described herein;
- an audio watermark database 822 that includes associations between audio watermarks and television programs; and
- an audio fingerprint database 824 that includes associations between audio fingerprints and television programs.

In some embodiments, the programs or modules identified above correspond to sets of instructions for performing a function described above. The sets of instructions can be executed by one or more processors (e.g., CPUs 802). The above identified modules or programs (i.e., sets of instructions) need not be implemented as separate software programs, procedures or modules, and thus various subsets of these programs or modules may be combined or otherwise re-arranged in various embodiments. In some embodiments, memory 810 stores a subset of the modules and data structures identified above. Furthermore, memory 810 may store additional modules and data structures not described above.

Although FIG. 8 shows a "server system," FIG. 8 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 8 could be implemented on single servers and single items could be implemented by one or more servers. The actual number of servers used to implement a server and how features are allocated among them will vary from one implementation to another, and may depend in part on the amount of data traffic that the system must handle during peak usage periods as well as during average usage periods.

Identifying Viewers of a TV Set

Figure 9:
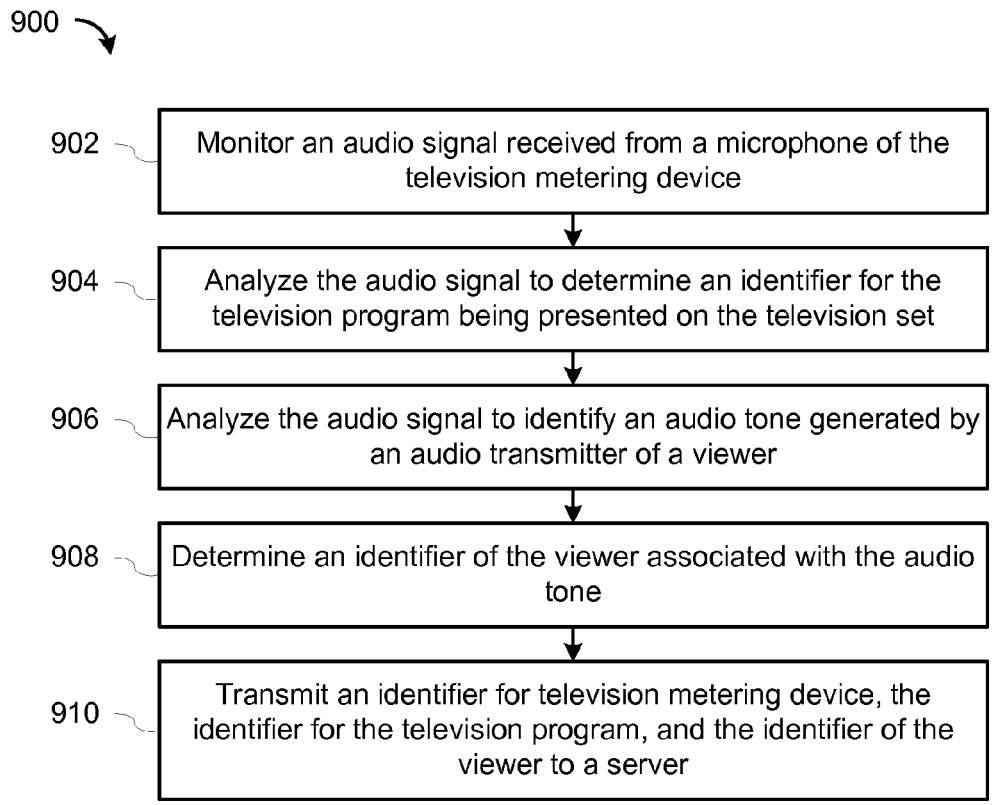
FIG. 9 is a flowchart of a method for identifying viewers of a television set, according to some embodiments.

FIG. 9 is a flowchart of a method 900 for identifying viewers of TV set 104, according to some embodiments. The analysis module 418 monitors (902) an audio signal received by a microphone of the television metering device, where the audio signal corresponds to audio of a television program presented on TV set 104 and at least one audio tone generated by at least one audio transmitter of at least one viewer of TV set 104.

The analysis module 418 analyzes (904) the audio signal to determine an identifier for the television program being presented on TV set 104.

In some embodiments, when analyzing the audio signal to determine the identifier for the television program being presented on TV set 104, the audio watermark module 422 analyzes the audio signal to extract an audio watermark embedded in the audio of the television program. The audio watermark may then be compared (e.g., by server system 114) to an audio watermark database (e.g., the audio watermark database 822) to identify the television program being presented on TV set 104.

In some embodiments, when analyzing the audio signal to determine the identifier for the television program being presented on TV set 104, audio fingerprint module 420 generates an audio fingerprint (or a sequence of fingerprints) of the television program, where the audio fingerprint (or sequence of fingerprints) is based on at least a portion of the audio of the television program. In some implementations, the audio fingerprint (or sequence of fingerprints) is compared (e.g., by server system 114) to an audio fingerprint database (e.g., the audio fingerprint database 824) to identify the television program being presented on TV set 104.

The frequency analysis module 424 analyzes (906) the audio signal to identify an audio tone generated by an audio transmitter of a viewer. For example, the frequency analysis module 424 may identify that audio tone 204 generated by the audio transmitter 110-1 of the viewer 108-1 is included in the audio signal. Operation 906 is described in more detail below with reference to FIG. 10.

Optionally, viewer identification module 426 determines (908) an identifier of the viewer associated with the audio tone. For example, viewer identification module 426 may query the viewer database 434 to determine the identifier of the viewer 108-1 who is associated with audio tone 204. In some embodiments, the identifier of the viewer is a user identifier (e.g., alphanumeric characters, etc.). Alternatively, in some embodiments the identifier of the viewer is an audio tone number (e.g., tone 1, tone 2, etc.) corresponding to audio tones in the predetermined range of audio frequencies allocated to audio transmitters of viewers. In these alternative embodiments, the viewer identifier is generated by analysis operation 906, and viewer identification module 426 is not needed. Furthermore, in these alternative embodiments, the audio tone number is mapped to a viewer identifier (e.g., a panelist identifier) at server system 114.

Reporting module 432 transmits (910) an identifier for TV metering device 106, the identifier for the television program, and the identifier of the viewer to server system 114. In embodiments where the identifier of the viewer is a tone number, server system 114 uses the tone number and the identifier for TV metering device 106 to identify the viewer 108-1. For example, tone 1 for TV metering device 106 may correspond to viewer 108-1 and tone 2 for TV metering device 106 may correspond to viewer 108-2.

In some embodiments, the identifier for TV metering device 106 includes a MAC address of TV metering device 106. In some embodiments, the identifier for TV metering device 106 includes an IP address of TV metering device 106.

Figure 10:
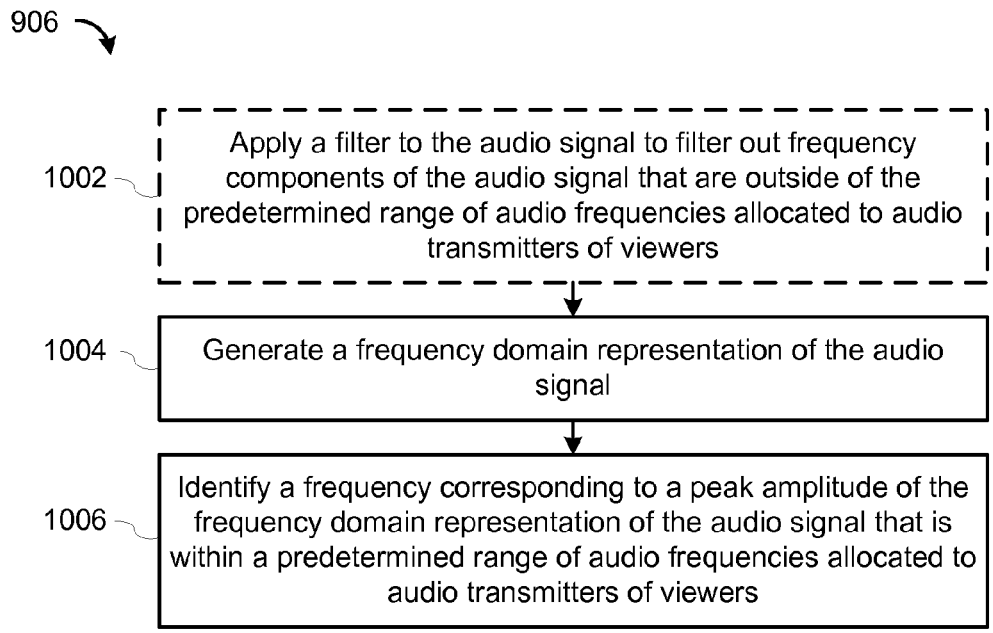
FIG. 10 is a flowchart of a method for analyzing an audio signal to identify an audio tone generated by an audio transmitter of a viewer, according to some embodiments.

FIG. 10 is a flowchart of a method for analyzing (906) the audio signal to identify the audio tone generated by the audio transmitter of a viewer, according to some embodiments. In some embodiments, the frequency analysis module 424 optionally applies (1002) a filter to the audio signal to filter out frequency components of the audio signal that are outside of the predetermined range of audio frequencies allocated to audio transmitters of viewers. Optionally, the filter is a low-pass filter, a band-pass filter, a band-stop filter, or a combination of two or more such filters.

Frequency analysis module 424 generates (1004) a frequency domain representation of the audio signal. In some embodiments, frequency analysis module 424 generates (1004) the frequency domain representation of the audio signal by performing a Fourier transform of the audio signal.

Frequency analysis module 424 then identifies (1006) a frequency corresponding to a peak amplitude of the frequency domain representation of the audio signal that is within a predetermined range of audio frequencies allocated to audio transmitters of viewers. In some embodiments, the peak amplitude of the frequency domain representation of the audio signal exceeds a predetermined amplitude that is determined based at least in part on an amplitude at which the audio transmitter generates the audio tone and a maximum distance between the audio transmitter and the television metering device at which the viewer is deemed to still be in a same room as the television set.

In the embodiments described with reference to FIG. 10, when determining (908) the identifier of the viewer associated with the audio tone, viewer identification module 426 determines a viewer identifier corresponding to the frequency having the peak amplitude within the predetermined range of audio frequencies allocated to audio transmitters of viewers.

Figure 11:
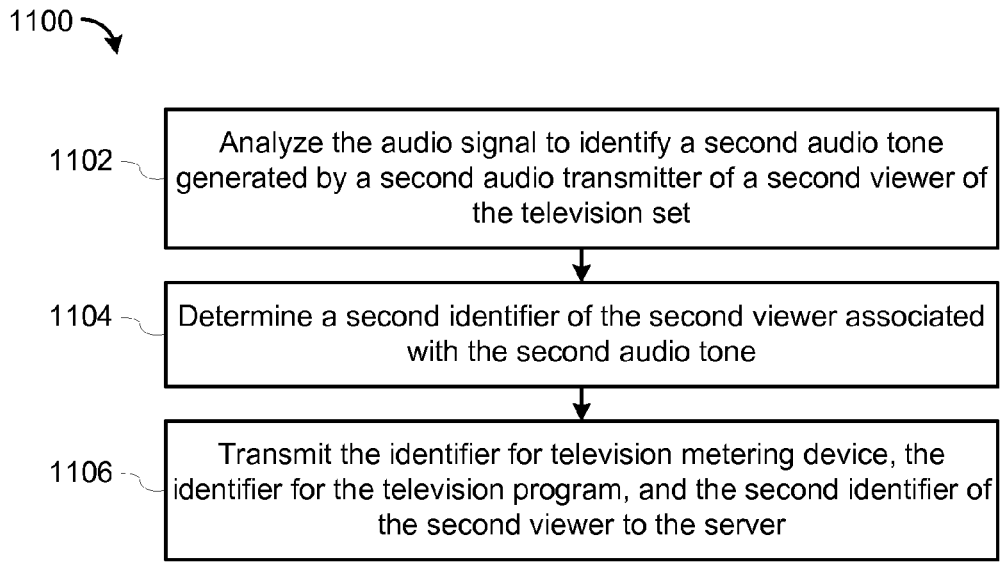
FIG. 11 is a flowchart of a method for identifying a second viewer of a television set, according to some embodiments.

FIG. 11 is a flowchart of a method 1100 for identifying a second viewer of a television set, according to some embodiments. The frequency analysis module 424 analyzes (1102) the audio signal to identify a second audio tone generated by a second audio transmitter of a second viewer of TV set 104 (e.g., as described above with reference to FIG. 10), where the second audio tone is separate and distinct from the audio tone described above with reference to FIG. 9.

The viewer identification module 426 determines (1104) a second identifier of the second viewer associated with the second audio tone.

Reporting module 432 transmits (1106) the identifier for TV metering device 106, the identifier for the television program, and the second identifier of the second viewer to server system 114.

In some implementations, operations 1006 and 1106 identify every frequency, within a predetermined range of audio frequencies allocated to audio transmitters of viewers, having an amplitude above a threshold amplitude. Optionally, the threshold amplitude is a predefined amplitude. Each identified frequency corresponds to a viewer who is located less than said maximum distance from television metering device at which the viewer is deemed to still be in the same room as the television set. When the number of identified frequencies is greater than one, there is more than one user (or viewer) of TV set 104.

Although FIGS. 9-11 were described with reference to TV set 104, TV metering device 106, viewers 108, audio transmitters 110, and server system 114, the methods discussed with reference to FIGS. 9-11 may be applied to any TV set, TV metering device, viewer, audio transmitter, and server system.

Identifying a Computer System being Used by Viewers of a TV Set

Figure 12:
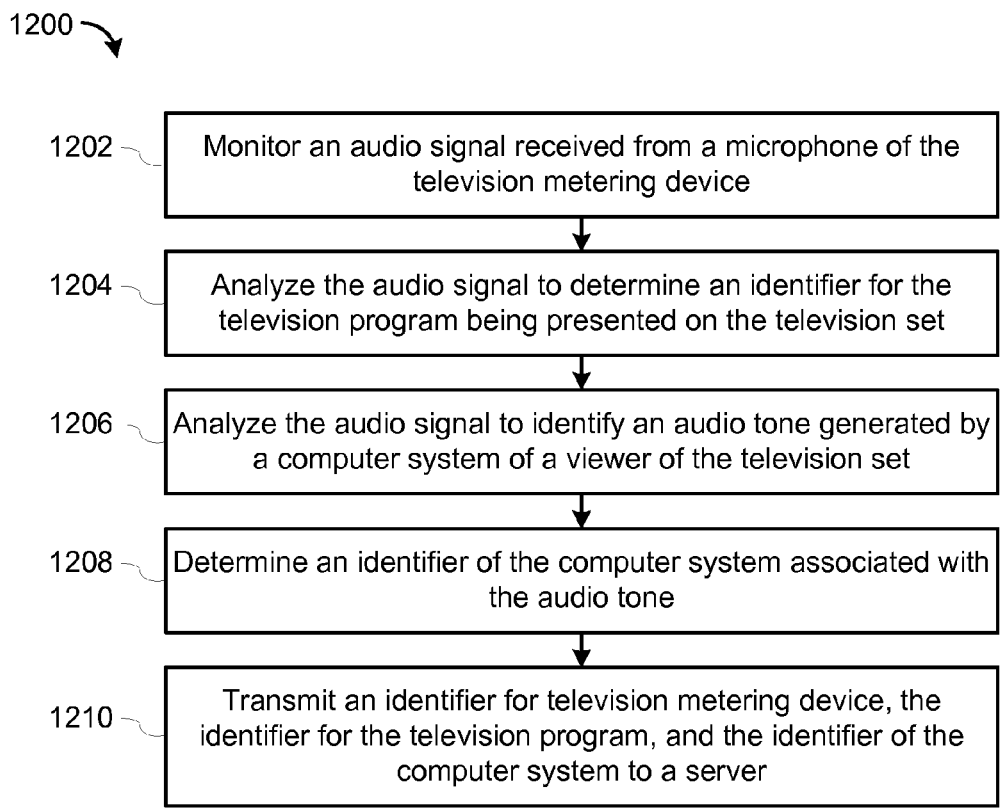
FIG. 12 is a flowchart of a method for identifying computer systems being used by viewers of a television set, according to some embodiments.

FIG. 12 is a flowchart of a method for identifying computer systems being used by viewers of a television set, according to some embodiments. Analysis module 418 monitors (1202) an audio signal received by a microphone of TV metering device 106, where the audio signal corresponds to audio of a television program presented on TV set 104 and at least one audio tone generated by at least one computer system of at least one viewer of TV set 104.

Analysis module 418 analyzes (1204) the audio signal to determine an identifier for the television program being presented on TV set 104.

In some embodiments, when analyzing the audio signal to determine the identifier for the television program being presented on TV set 104, audio watermark module 422 analyzes the audio signal to extract an audio watermark embedded in the audio of the television program. As discussed above, the audio watermark may then be compared (e.g., by server system 114) to an audio watermark database (e.g., the audio watermark database 822) to identify the television program being presented on TV set 104.

In some embodiments, when analyzing the audio signal to determine the identifier for the television program being presented on TV set 104, audio fingerprint module 420 generates an audio fingerprint (or a sequence of fingerprints) of the television program, where the audio fingerprint includes information concerning at least one spectrum characteristic of the audio of the television program. As discussed above, the audio fingerprint (or a sequence of fingerprints) is compared (e.g., by server system 114) to an audio fingerprint database (e.g., the audio fingerprint database 824) to identify the television program being presented on TV set 104.

Frequency analysis module 424 analyzes (1206) the audio signal to identify an audio tone generated by a computer system (e.g., computer system 112) of a viewer of TV set 104. Operation 1206 is described in more detail below with reference to FIG. 14.

Computer identification module 428 determines (1208) an identifier of the computer system associated with the audio tone. For example, computer identification module 428 may query the computer system database 436 using audio tone 302 to determine the identifier of computer system 112 that is associated with audio tone 302. In some embodiments, the identifier of the computer system is a MAC address. In some embodiments, the identifier of the computer system is an IP address. In some embodiments, the identifier of the computer system is a tone number (e.g., tone 1, tone 2, etc.) that falls within a predetermined range of audio frequencies allocated to the computers of viewers.

The reporting module 432 transmits (1210) an identifier for TV metering device 106, the identifier for the television program, and the identifier of the computer system to server system 114. In embodiments where the identifier of the computer system is a tone number, server system 114 users the tone number and the identifier for TV metering device 106 to identify the computer system. For example, tone 1 for TV metering device 106 may correspond to computer system 112.

In some embodiments, the identifier for TV metering device 106 includes a MAC address of TV metering device 106. In some embodiments, the identifier for TV metering device 106 includes an IP address of TV metering device 106.

In some embodiments, the identifier for the computer system includes a MAC address of the computer system (e.g., a MAC address of a network adapter for the computer system). In some embodiments, the identifier for the computer system includes an IP address of the computer system.

Figure 13:
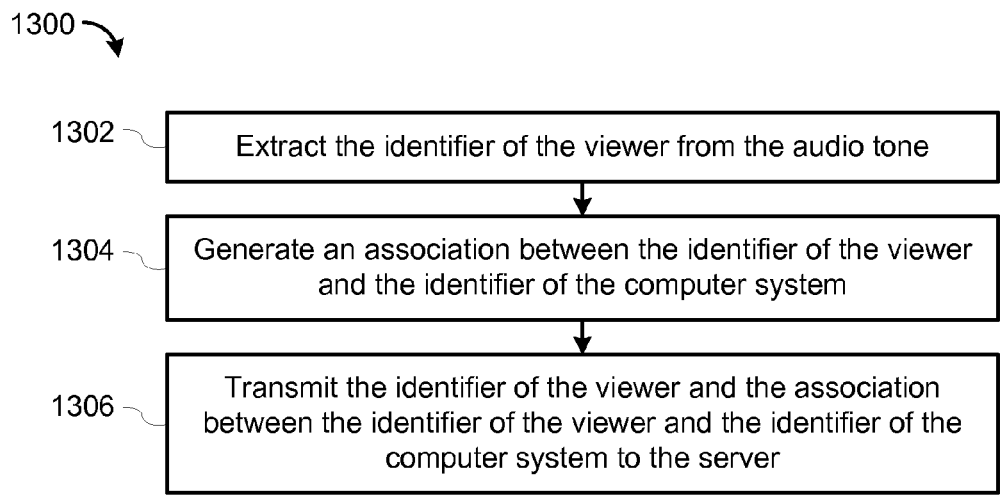
FIG. 13 is a flowchart of a method for identifying a viewer who is using a computer system, according to some embodiments.

As discussed above, the computer system being used by the viewer may encode an identifier for the viewer. FIG. 13 is a flowchart of a method 1300 for identifying a viewer who is using a computer system, according to some embodiments. The frequency analysis module 424 extracts (1302) the identifier of the viewer from the audio tone. For example, the frequency analysis module 424 may extract the identifier of the viewer from the audio tone by demodulating the audio tone. Note that the process for encoding the identifier of the viewer into the audio tone is described in more detail below with reference to FIGS. 16 and 17.

The reporting module 432 then generates (1304) an association between the identifier of the viewer and the identifier of the computer system and transmits (1306) the identifier of the viewer and the association between the identifier of the viewer and the identifier of the computer system to the server.

Figure 14:
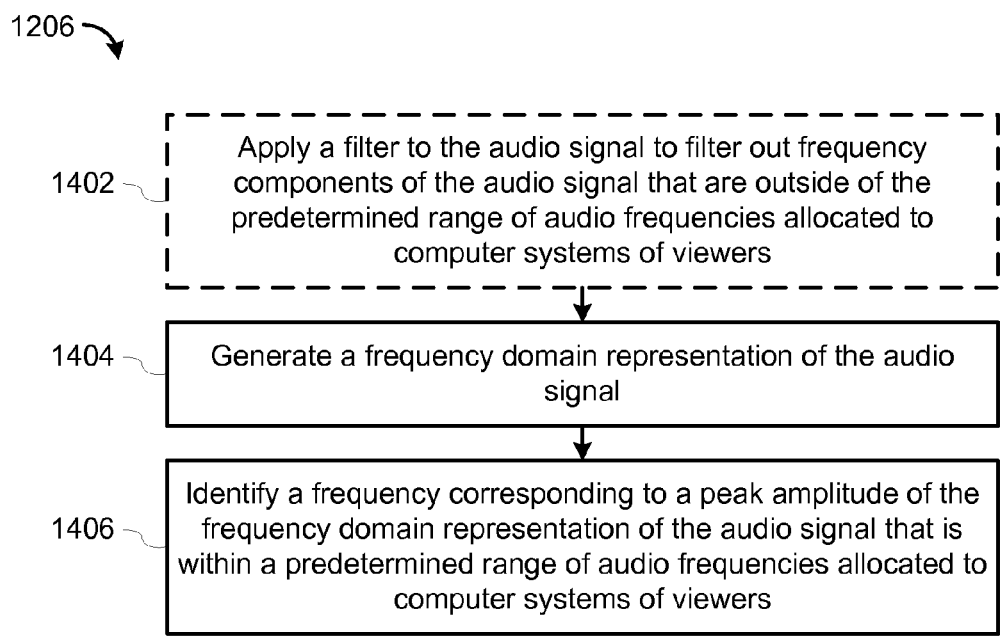
FIG. 14 is a flowchart of a method for analyzing an audio signal to identify an audio tone generated by a computer system of a viewer, according to some embodiments.

FIG. 14 is a flowchart of a method for analyzing (1206) an audio signal to identify an audio tone generated by a computer system of a viewer, according to some embodiments. In some embodiments, the frequency analysis module 424 optionally applies (1402) a filter to the audio signal to filter out frequency components of the audio signal that are outside of the predetermined range of audio frequencies allocated to computer systems of viewers. Optionally, the filter is a low-pass filter, a band-pass filter, a band-stop filter, or a combination of two or more such filters.

The frequency analysis module 424 generates (1404) a frequency domain representation of the audio signal. In some embodiments, the frequency analysis module 424 generates (1404) the frequency domain representation of the audio signal by performing a Fourier transform of the audio signal.

The frequency analysis module 424 then identifies (1406) a frequency corresponding to a peak amplitude of the frequency domain representation of the audio signal that is within a predetermined range of audio frequencies allocated to computer systems of viewers. In some embodiments, the peak amplitude of the frequency domain representation of the audio signal exceeds a predetermined amplitude that is determined based at least in part on an amplitude at which the computer system generates the audio tone and a maximum distance between the computer system and the television metering device at which the computer system is deemed to still be in a same room as the television set.

In the embodiments described with reference to FIG. 14, when determining (1208) the identifier of the computer system associated with the audio tone, the computer identification module 428 determines a computer system identifier corresponding to the frequency having the peak amplitude within the predetermined range of audio frequencies allocated to computer systems of viewers.

Figure 15:
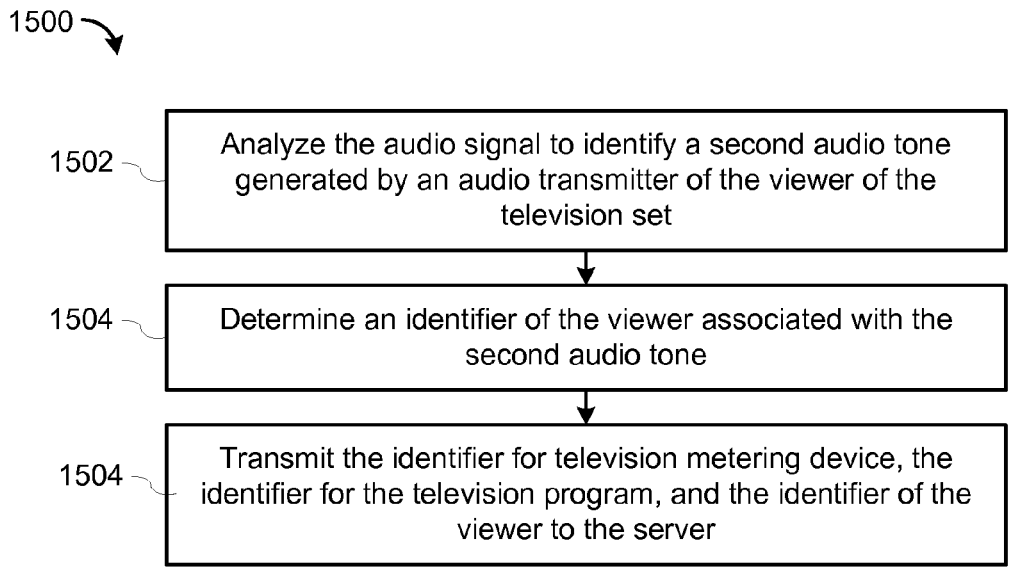
FIG. 15 is a flowchart of a method for identifying a second viewer of a television set, according to some embodiments.

FIG. 15 is a flowchart of a method 1500 for identifying a second viewer of a television set, according to some embodiments. The frequency analysis module 424 analyzes (1502) the audio signal to identify a second audio tone generated by an audio transmitter of the viewer of TV set 104 (e.g., as described above with reference to FIG. 14), where the second audio tone is separate and distinct from the audio tone described above with reference to FIG. 12.

The viewer identification module 426 determines (1504) an identifier of the viewer associated with the second audio tone.

The reporting module 432 transmits (1106) the identifier for television metering device, the identifier for the television program, and the identifier of the viewer to server system 114.

In some embodiments, the audio tone is generated by a speaker of the mobile device. In some embodiments, the audio tone generated by the computer system of the viewer is a sub-audible tone. In some embodiments, the audio tone generated by the computer system of the viewer includes a single audio frequency within a predetermined range of audio frequencies.

Figure 16:
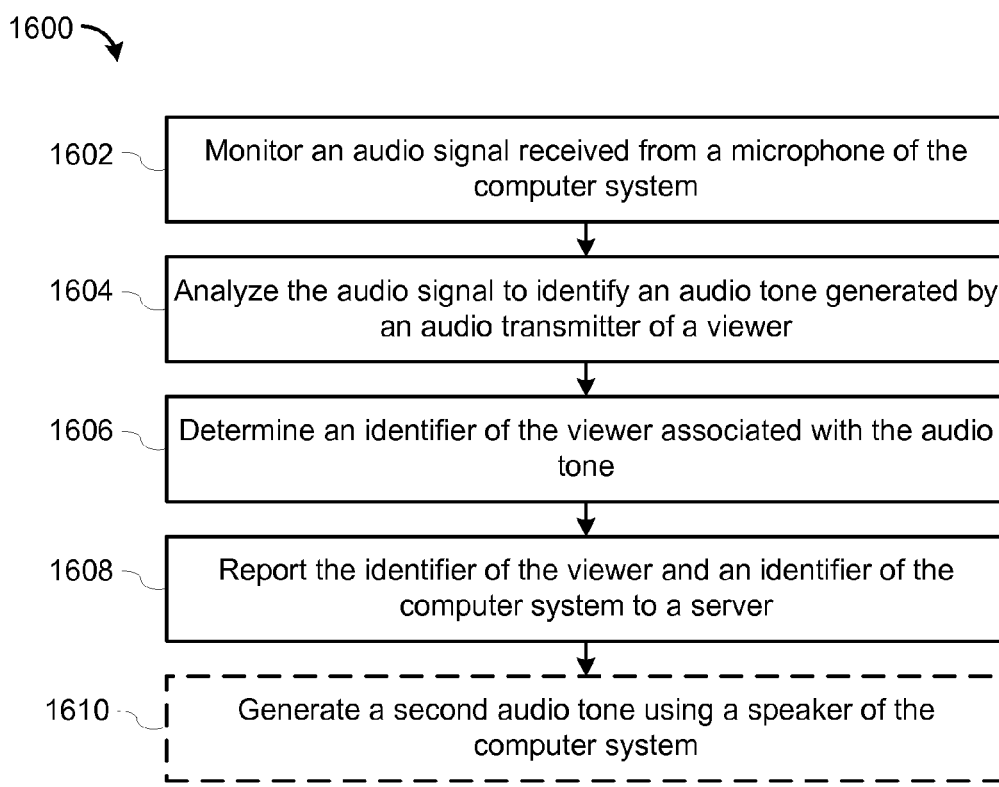
FIG. 16 is a flowchart of another method for identifying viewers of a television set that are using computer systems, according to some embodiments.

FIG. 16 is a flowchart of a method 1600 for identifying viewers of a television set that are using computer systems (e.g., computer system 112), according to some embodiments.

The analysis module 518 monitors (1602) an audio signal received by a microphone of the computer system (e.g., computer system 112), where the audio signal corresponds to at least one audio tone generated by at least one audio transmitter of at least one viewer of TV set 104.

The analysis module 518 analyzes (1604) the audio signal to identify an audio tone generated by an audio transmitter of a viewer. Note that operation 1604 is described in more detail below with reference to FIG. 17.

The viewer identification module 522 determines (1606) an identifier of the viewer associated with the audio tone.

The reporting module 526 reports (1608) the identifier of the viewer and an identifier of the computer system to server system 114.

In some embodiments, when reporting the identifier of the viewer to server system 114, the reporting module 526 generates a second audio tone using a speaker of the computer system, where the identifier of the viewer is encoded in the second audio tone, and wherein the second audio tone is usable by TV metering device 106 to identify the computer system to server system 114.

In some embodiments, when reporting the identifier of the viewer to server system 114, the reporting module 526 transmits the identifier of the computer system and the identifier of the viewer to server system 114 via a network (e.g., network 120).

In some embodiments, the audio tone generation application 532 generates a second audio tone using a speaker of the computer system, where the second audio tone is usable by TV metering device 106 to identify the computer system to server system 114.

In some embodiments, the second audio tone generated by the speaker of the computer system is a sub-audible tone. In some embodiments, the second audio tone generated by the speaker of the computer system includes a single audio frequency within a predetermined range of audio frequencies allocated to computer system.

Figure 17:
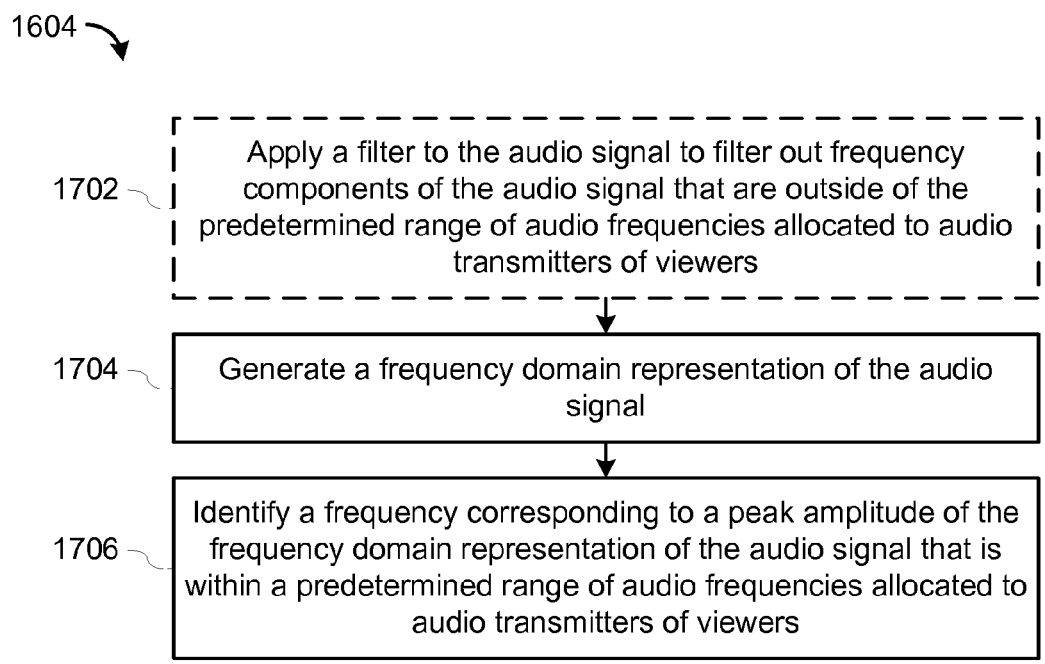
FIG. 17 is a flowchart of a method for analyzing an audio signal to identify the audio tone generated by an audio transmitter of a viewer, according to some embodiments.

FIG. 17 is a flowchart of a method for analyzing (1604) an audio signal to identify the audio tone generated by an audio transmitter of a viewer, according to some embodiments. In some embodiments, frequency analysis module 520 optionally applies (1702) a filter to the audio signal to filter out frequency components of the audio signal that are outside of the predetermined range of audio frequencies allocated to audio transmitters of viewers. Optionally, the filter is a low-pass filter, a band-pass filter, a band-stop filter, or a combination of two or more such filters.

Frequency analysis module 520 generates (1704) a frequency domain representation of the audio signal and identifies (1706) a frequency corresponding to a peak amplitude of the frequency domain representation of the audio signal that is within a predetermined range of audio frequencies allocated to audio transmitters of viewers. In some embodiments, when generating the frequency domain representation of the audio signal, the frequency analysis module 520 performs a Fourier transform of the audio signal.

In some embodiments, the peak amplitude of the frequency domain representation of the audio signal exceeds a predetermined amplitude that is determined based at least in part on an amplitude at which the audio transmitter generates the audio tone and a maximum distance between the audio transmitter and the computer system at which the viewer is deemed to still be using the computer system.

In some embodiments, when determining the identifier of the audio transmitter associated with the audio tone, viewer identification module 522 determines a viewer identifier corresponding to the frequency having the peak amplitude within the predetermined range of audio frequencies allocated to computer systems of viewers.

In some implementations, operations 1606 and 1706 identify every frequency, within a predetermined range of audio frequencies allocated to audio transmitters of viewers, having an amplitude above a threshold amplitude. Optionally, the threshold amplitude is a predefined amplitude. Each identified frequency corresponds to a viewer who is located less than said maximum distance from the computer. When the number of identified frequencies is greater than one, there is more than one user (or viewer) of the computer.

Although FIGS. 9-17 are described above with reference to TV set 104, TV metering device 106, viewers 108, audio transmitters 110, computer system 112, and server system 114, the methods discussed with reference to FIGS. 9-11 may be applied to other TV sets, TV metering devices, viewers, audio transmitters, computer systems and server systems.

The methods illustrated in FIGS. 9-17 are typically governed by instructions that are stored in a computer readable storage medium and that are executed by one or more processors of a TV metering device. Each of the operations shown in FIGS. 9-17 typically correspond to instructions stored in a non-transitory computer memory or computer readable storage medium. In various implementations, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the embodiment(s).

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A computer-implemented method for identifying computer systems being used by viewers of television programs, performed on a television metering device having at least one processor and memory storing at least one program for execution by the at least one processor to perform the method, comprising:
    monitoring an audio signal received by a microphone of the television metering device, the audio signal corresponding to audio of a television program presented on the television set, at least one audio tone generated by at least one audio transmitter of at least one viewer of the television set, and at least one audio tone generated by at least one computer system in use by at least one viewer of the television set;
    analyzing the audio signal to determine an identifier for the television program being presented on the television set;
    analyzing the audio signal to identify a first audio tone generated by an audio transmitter of a viewer of the television set;
    analyzing the audio signal to identify a second audio tone generated by the at least one computer system in use by the viewer of the television set;
    determining an identifier of the viewer corresponding to the first audio tone identified by analyzing the audio signal;
    determining an identifier of the computer system corresponding to the second audio tone and an identifier of the viewer encoded in the second audio tone, identified by analyzing the audio signal; and
    transmitting an identifier for the television metering device, the identifier for the television program, the identifier of the viewer corresponding to the first audio tone, and the identifier of the computer system to a server.

2. The computer-implemented method of claim 1, the method further includes:
    generating an association between the identifier of the viewer extracted from the second audio tone and the identifier of the computer system; and
    transmitting the identifier of the viewer extracted from the second audio tone and the association between the identifier of the viewer extracted from the second audio tone and the identifier of the computer system to the server.

3. The computer-implemented method of claim 1, wherein analyzing the audio signal to determine the identifier for the television program being presented on the television set includes analyzing the audio signal to extract an audio watermark embedded in the audio of the television program.

4. The computer-implemented method of claim 1, wherein analyzing the audio signal to determine the identifier for the television program being presented on the television set includes generating an audio fingerprint of the television program, wherein the audio fingerprint is based on information concerning at least one spectrum characteristic of the audio of the television program.

5. The computer-implemented method of claim 1, wherein analyzing the audio signal to identify the audio tone generated by the computer system of the viewer includes:
    generating a frequency domain representation of the audio signal; and
    identifying a frequency corresponding to a peak amplitude of the frequency domain representation of the audio signal that is within a predetermined range of audio frequencies allocated to computer systems of viewers.

6. The computer-implemented method of claim 5, wherein generating the frequency domain representation of the audio signal includes performing a Fourier transform of the audio signal.

7. The computer-implemented method of claim 5, wherein determining the identifier of the computer system corresponding to the second audio tone includes determining a computer system identifier corresponding to the frequency having the peak amplitude within the predetermined range of audio frequencies allocated to computer systems of viewers.

8. The computer-implemented method of claim 1, wherein analyzing the audio signal to identify a first audio tone includes analyzing the audio signal to identify a plurality of audio tones generated by a plurality of audio transmitters of a plurality of viewers, and the method further comprises identifying each of the plurality of audio tones having an amplitude above a predefined threshold amplitude, determining an identifier of each of the plurality of viewers corresponding to each audio tone having an amplitude above the predefined threshold amplitude, and transmitting to the server the determined identifier of the viewer for each audio tone identified as having an amplitude above the predefined threshold amplitude.

9. The computer-implemented method of claim 5, wherein prior to generating the frequency domain representation of the audio signal, the method includes applying a filter to the audio signal to filter out frequency components of the audio signal that are outside of the predetermined range of audio frequencies allocated to computer systems of viewers.

10. The computer-implemented method of claim 1, wherein the first and second audio tones are in an inaudible frequency range.

11. The computer-implemented method of claim 1, wherein the first audio tone generated by the audio transmitter of the viewer includes a single audio frequency within a predetermined range of audio frequencies.

12. The computer-implemented method of claim 1, wherein the audio transmitter includes a mobile device for the viewer, the mobile device including a speaker, a display, and one or more input devices, and wherein the first audio tone is generated by the speaker of the mobile device.

13. The computer-implemented method of claim 1, wherein the second audio tone generated by the computer system of the viewer includes a single audio frequency within a predetermined range of audio frequencies.

14. The computer-implemented method of claim 1, wherein the second audio tone is generated while the viewer is using the computer system.

15. The computer-implemented method of claim 1, wherein the microphone of the television metering device is connected wirelessly to the television metering device, and the television metering device is in a room separate and distinct from a room in which the television set is located.

16. A system to identify computer systems being used by viewers of television programs, comprising:
   at least one processor;
   memory; and
   at least one program stored in the memory and executable by the at least one processor, the at least one program comprising instructions to:
     monitor an audio signal received by a microphone of a television metering device, the audio signal corresponding to audio of a television program presented on the television set, at least one audio tone generated by at least one audio transmitter of at least one viewer of the television set, and at least one audio tone generated by at least one computer system in use by at least one viewer of the television set;
     analyze the audio signal to determine an identifier for the television program being presented on the television set;
     analyze the audio signal to identify a first audio tone generated by an audio transmitter of a viewer of the television set;
     analyze the audio signal to identify a second audio tone generated by the at least one computer system in use by the viewer of the television set;
     determine an identifier of the viewer corresponding to the first audio tone identified by analyzing the audio signal;
     determine an identifier of the computer system corresponding to the second audio tone and an identifier of the viewer encoded in the second audio tone, identified by analyzing the audio signal; and
     transmit an identifier for the television metering device, the identifier for the television program, the identifier of the viewer corresponding to the first audio tone, and the identifier of the computer system to a server.

17. The system of claim 16, wherein the at least one program includes instructions to:
   generate an association between the identifier of the viewer extracted from the second audio tone and the identifier of the computer system; and
   transmit the identifier of the viewer extracted from the second audio tone and the association between the identifier of the viewer extracted from the second audio tone and the identifier of the computer system to the server.

18. The system of claim 16, wherein the instructions to analyze the audio signal to determine the identifier for the television program being presented on the television set include instructions to analyze the audio signal to extract an audio watermark embedded in the audio of the television program.

19. The system of claim 16, wherein the instructions to analyze the audio signal to determine the identifier for the television program being presented on the television set include instructions to generate an audio fingerprint of the television program, wherein the audio fingerprint is based on information concerning at least one spectrum characteristic of the audio of the television program.

20. The system of claim 16, wherein the instructions to analyze the audio signal to identify the audio tone generated by the computer system of the viewer include instructions to:
   generate a frequency domain representation of the audio signal; and
   identify a frequency corresponding to a peak amplitude of the frequency domain representation of the audio signal that is within a predetermined range of audio frequencies allocated to computer systems of viewers.

21. The system of claim 20, wherein the instructions to generate the frequency domain representation of the audio signal include instructions to perform a Fourier transform of the audio signal.

22. The system of claim 20, wherein the instructions to determine the identifier of the computer system corresponding to the second audio tone include instructions to determine a computer system identifier corresponding to the frequency having the peak amplitude within the predetermined range of audio frequencies allocated to computer systems of viewers.

23. The system of claim 16, wherein the instructions to analyze the audio signal to identify a first audio tone include instructions to analyze the audio signal to identify a plurality of audio tones generated by a plurality of audio transmitters of a plurality of viewers, and the instructions further comprise identify each of the plurality of audio tones having an amplitude above a predefined threshold amplitude, determine an identifier of each of the plurality of viewers corresponding to each audio tone having an amplitude above the predefined threshold amplitude, and transmit to the server the determined identifier of the viewer for each audio tone identified as having an amplitude above the predefined threshold amplitude.

24. The system of claim 20, wherein prior to generating the frequency domain representation of the audio signal, the at least one program includes instructions to apply a filter to the audio signal to filter out frequency components of the audio signal that are outside of the predetermined range of audio frequencies allocated to computer systems of viewers.

25. The system of claim 16, wherein the first and second audio tones are in an inaudible frequency range.

26. The system of claim 16, wherein the first audio tone generated by the audio transmitter of the viewer includes a single audio frequency within a predetermined range of audio frequencies.

27. The system of claim 16, wherein the audio transmitter includes a mobile device for the viewer, the mobile device including a speaker, a display, and one or more input devices, and wherein the first audio tone is generated by the speaker of the mobile device.

28. The system of claim 16, wherein the second audio tone generated by the computer system of the viewer includes a single audio frequency within a predetermined range of audio frequencies.

29. The system of claim 16, wherein the second audio tone is generated while the viewer is using the computer system.

30. The system of claim 16, wherein the microphone of the television metering device is connected wirelessly to the television metering device, and the television metering device is in a room separate and distinct from a room in which the television set is located.

31. A non-transitory computer readable storage medium storing at least one program configured for execution by at least one processor of a computer system, the at least one program comprising instructions to:
  monitor an audio signal received by a microphone of a television metering device, the audio signal corresponding to audio of a television program presented on the television set, at least one audio tone generated by at least one audio transmitter of at least one viewer of the television set, and at least one audio tone generated by at least one computer system in use by at least one viewer of the television set;
  analyze the audio signal to determine an identifier for the television program being presented on the television set;
  analyze the audio signal to identify a first audio tone generated by an audio transmitter of a viewer of the television set;
  analyze the audio signal to identify a second audio tone generated by the at least one computer system in use by the viewer of the television set;
  determine an identifier of the viewer corresponding to the first audio tone identified by analyzing the audio signal;
  determine an identifier of the computer system corresponding to the second audio tone and an identifier of the viewer encoded in the second audio tone, identified by analyzing the audio signal; and
  transmit an identifier for the television metering device, the identifier for the television program, the identifier of the viewer corresponding to the first audio tone, and the identifier of the computer system to a server.

32. The non-transitory computer readable storage medium of claim 31, wherein the instructions to analyze the audio signal to identify a first audio tone include instructions to analyze the audio signal to identify a plurality of audio tones generated by a plurality of audio transmitters of a plurality of viewers, and the instructions further comprise identify each of the plurality of audio tones having an amplitude above a predefined threshold amplitude, determine an identifier of each of the plurality of viewers corresponding to each audio tone having an amplitude above the predefined threshold amplitude, and transmit to the server the determined identifier of the viewer for each audio tone identified as having an amplitude above the predefined threshold amplitude.

33. The non-transitory computer readable storage medium of claim 31, wherein the first and second audio tones are in an inaudible frequency range.

34. The non-transitory computer readable storage medium of claim 31, wherein the audio transmitter includes a mobile device for the viewer, the mobile device including a speaker, a display, and one or more input devices, and wherein the first audio tone is generated by the speaker of the mobile device.

35. The non-transitory computer readable storage medium of claim 31, wherein the microphone of the television metering device is connected wirelessly to the television metering device, and the television metering device is in a room separate and distinct from a room in which the television set is located.

\* \* \* \* \*